(12) United States Patent
Samuel

(10) Patent No.: US 12,704,058 B2
(45) Date of Patent: Aug. 11, 2026

(54) CALIBRATION OF DRILLSTRING WEIGHT WITH DRAG FOR FRICTION FACTOR ESTIMATION

(71) Applicant: Landmark Graphics Corporation, Houston, TX (US)

(72) Inventor: Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 320 days.

(21) Appl. No.: 17/445,582

(22) Filed: Aug. 20, 2021

(65) Prior Publication Data

US 2023/0054050 A1 Feb. 23, 2023

(51) Int. Cl.
*E21B 47/007* (2012.01)
*E21B 12/00* (2006.01)
*G01N 19/02* (2006.01)

(52) U.S. Cl.
CPC ............ *E21B 47/007* (2020.05); *E21B 12/00* (2013.01); *G01N 19/02* (2013.01)

(58) Field of Classification Search
CPC ........ E21B 47/007; E21B 12/00; G01N 19/02
See application file for complete search history.

(56) References Cited

U.S. PATENT DOCUMENTS 4,384,625 A 5/1983 Roper et al.
4,665,996 A 5/1987 Foroulis et al.
5,044,198 A * 9/1991 Ho ........................ E21B 47/007 73/152.59
7,991,554 B2 8/2011 Calhoun et al.
9,229,603 B2 1/2016 Deimbacher et al.
9,388,680 B2 7/2016 Moran et al.
9,528,974 B2 12/2016 Livescu et al.
(Continued)

FOREIGN PATENT DOCUMENTS

CN 105408582 3/2016
EP 2798150 11/2014
(Continued)

OTHER PUBLICATIONS

"PCT Application No. PCT/US2021/071257, International Search Report and Written Opinion", May 10, 2022, 8 pages.
(Continued)

*Primary Examiner* — Tara Schimpf
*Assistant Examiner* — Lamia Quaim
(74) *Attorney, Agent, or Firm* — DeLizio, Peacock, Lewin & Guerra LLP

(57) ABSTRACT

A method comprises determining a value of at least one oppositional force for a drillstring at multiple depths in the wellbore, determining a value of a drag force for the drillstring at the multiple depths, determining a value of hook load for the drillstring at the multiple depths based on the value of the at least one opposition force and the value of the drag force at the multiple depths, and determining a calibrated drillstring weight based on a change in the value of the hook load over the multiple depths. From the calibrated drillstring weight, an adjusted estimated hook load can be determined. The drag force can be calculated based on a drag per centralizer and the number of centralizers in the wellbore. A centralizer friction factor can be determined and used to calibrate the value of the drag per centralizer.

20 Claims, 15 Drawing Sheets

(56) References Cited

U.S. PATENT DOCUMENTS

| | | | | |
|---|---|---|---|---|
| 9,638,830 | B2 | 5/2017 | Meyer et al. | |
| 9,953,114 | B2* | 4/2018 | O'Donnell | G06F 30/20 |
| 10,678,966 | B2 | 6/2020 | Samuel et al. | |
| 11,549,356 | B2 | 1/2023 | Mittal et al. | |
| 11,578,583 | B2 | 2/2023 | Samuel | |
| 2009/0164125 | A1 | 6/2009 | Bordakov et al. | |
| 2011/0172923 | A1 | 7/2011 | Van Os et al. | |
| 2013/0049982 | A1 | 2/2013 | Hartmann | |
| 2013/0311147 | A1 | 11/2013 | Greenwood | |
| 2014/0116776 | A1 | 5/2014 | Marx et al. | |
| 2014/0121971 | A1 | 5/2014 | Hanak | |
| 2014/0196949 | A1* | 7/2014 | Hareland | E21B 44/02 175/27 |
| 2015/0186570 | A1 | 7/2015 | Huang et al. | |
| 2015/0211352 | A1 | 7/2015 | Sugiura | |
| 2015/0361779 | A1 | 12/2015 | Haq et al. | |
| 2017/0098020 | A1 | 4/2017 | Samuel et al. | |
| 2017/0342808 | A1 | 11/2017 | Dykstra et al. | |
| 2018/0328164 | A1 | 11/2018 | Gajic et al. | |
| 2019/0048703 | A1 | 2/2019 | Samuel et al. | |
| 2019/0178059 | A1* | 6/2019 | Zheng | E21B 44/00 |
| 2019/0277130 | A1 | 9/2019 | Losoya et al. | |
| 2020/0355061 | A1 | 11/2020 | Gharib et al. | |
| 2022/0188712 | A1 | 6/2022 | Mittal et al. | |
| 2022/0412182 | A1 | 12/2022 | Samuel et al. | |
| 2023/0059507 | A1* | 2/2023 | Samuel | E21B 12/00 |
| 2023/0095708 | A1 | 3/2023 | Wesley et al. | |

FOREIGN PATENT DOCUMENTS

| | | |
|---|---|---|
| WO | 2012106347 | 8/2012 |
| WO | 2014160625 | 10/2014 |
| WO | 2019178240 | 9/2019 |
| WO | 2021021140 | 2/2021 |

OTHER PUBLICATIONS

"PCT Application No. PCT/US2021/071258, International Search Report and Written Opinion", May 12, 2022, 11 pages.

"U.S. Appl. No. 17/117,910 Office Action", Mar. 7, 2022, 13 pages.

Long, et al., "Centralizer Selection and Placement Basis for Overcoming Liner Running Challenges in Extended-Reach Horizontal Three Forks Shale Completions", Unconventional Resources Technology Conference, San Antonio TX, Aug. 3, 2016.

"U.S. Appl. No. 17/445,578, Non-Final Office Action", Dec. 20, 2022, 16 pages.

"U.S. Appl. No. 17/445,578, Final Office Action", Apr. 5, 2023, 6 pages.

"U.S. Appl. No. 17/445,578, Non-Final Office Action", Jul. 19, 2023, 12 pages.

Johancsik, et al., "Torque and Drag in Directional Wells-Prediction and Measurement", Journal of Petroleum Technology, Jun. 1984, pp. 987-992.

Lesage, et al., "Evaluating Drilling Practice In Deviated Wells With Torque and Weight Data", Society of Petroleum Engineers Drilling Engineering SPE-16114, Sep. 1988, pp. 248-252.

Mitchell, et al., "How Good Is The Torque/Drag Model?", Society of Petroleum Engineers SPE Drilling & Completion SPE-105068, Mar. 2009, pp. 62-71.

Samuel, Robello, "Friction factors: What are they for torque, drag, vibration, bottom hole assembly and transient surge/swab analyses?", Journal of Petroleum Science and Engineering 73 (2010) SPE-128059, Feb. 2010, pp. 258-266.

* cited by examiner

CALIBRATION OF DRILLSTRING WEIGHT WITH DRAG FOR FRICTION FACTOR ESTIMATION

TECHNICAL FIELD

The disclosure generally relates to the field of earth or rock drilling or mining and more particularly to drillstring friction factor estimation and hook load calibrations.

BACKGROUND

During drilling of a wellbore using a drillstring, an attribute of such drilling includes a hook load, which can be defined as the weight or downward force on the drill string. A friction factor can be defined based on the relationship between estimated or predicted hook load and measured hook load. From friction factor, information about the wellbore, drilling apparatus (such as drill bit, bottom hole assembly (BHA), drillstring, etc.), and drilling operation can be inferred and drilling operations monitored, controlled, and improved. Hook load, which is the observable weight of the drillstring at the drill rig or other support at the surface of the wellbore, can be affected by various factors (including one or more of weight of drillstring components (e.g., drill pipe, tools, etc.) in air, mud density, flowrate, tool joints, couplings, centralizers, casing material, hole cleaning, standoff devices, inner strings, etc.).

An estimated or predicted hook load can be calculated based a calculated or estimated drillstring weight in air with an estimated or predicted buoyant force subtracted. The estimated drillstring weight in air can be calculated or estimated based on manufacturer-provided specifications or measurements of weight or mass of the sum of the drillstring components. The estimated buoyant force, which reduces the hook load, can be calculated based on fluid density of mud weight within the wellbore and the volume of fluid displaced by the drillstring. Other estimated forces can be similarly calculated when applicable.

The predicted hook load can vary from the measured hook load due to miscalculations (for example, underreported drill pipe component weight) or due to non-idealities (for example, changes in drilling mud density due to formation fluid influx) or due to drilling factors (e.g., drill pipe rotation which introduces dynamic friction, transfer of drillstring weight to one or more formation face as weight-on-bit, etc.). Adjustments to the estimated hook load can be made to the estimated drillstring weight (or estimated drillstring weight in air) and/or the estimated buoyant force to bring the estimated hook load in line with the measured hook load. Traditionally, the estimated hook load is adjusted or calibrated using adjustments to the fluid density or buoyant force, initial block weight (i.e., drillstring in air weight), weight of various components, or a combination thereof. A variety of adjustments can be performed, such as using a trial-and-error method and/or iterative adjustments, to match the estimated hook load to the measured hook load. Improper calibration of the estimated hook load can reduce the usefulness of the friction factor for monitoring drilling operations—by either removing drilling effects from the friction factor or by including wellbore factors in the friction factor which should be removed.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to a soft string approximation in illustrative examples. Embodiments of this disclosure can be also applied to rigid pipe approximations. In other instances, well-known instruction instances, protocols, structures, and techniques have not been shown in detail in order not to obfuscate the description.

Example embodiments can calibrate or adjust estimated drillstring weight based on measured hook load in vertical or substantially vertical portions or of the well. For example, example embodiments can adjust the estimated hook load based on the measured hook load, where a calculated buoyant force is added to the measured hook load to determine the adjusted drillstring weight. The estimated drillstring weight can then be adjusted based on a comparison between the slope of the measured hook load and the slope of the estimated hook load.

Various example embodiments can also adjust the estimated hook load based on the measured hook load, where a calculated piston force (in the case of nested drillstrings and/or tapered drillstrings) and/or calculated hydrodynamic force (in the case of flowing drilling mud or other fluid) is added to the measured hook load to determine the adjusted drillstring weight. The estimated drillstring weight can then be adjusted based on a comparison between the slope of the measured hook load, the slope of the estimated hook load, and a relationship between inner and outer string weights.

Various example embodiments also adjust the estimated hook load based on the measured hook load for a drillstring with centralizers (or standoff devices). For a drillstring with centralizers, running drag can be calculated and added to the measured hook load to determine adjusted drillstring weight. The estimated drillstring weight can then be adjusted based on a comparison between the slope of the measured hook load and the slope of the estimated hook load. Various example embodiments can determine a centralizer friction factor based on the adjusted drillstring weight, calculated running drag, and measured hook load. The centralizer friction factor can then be monitored as a function of depth and used to calibrate the running drag calculation. Additionally, estimated hook load can be calibrated or adjusted during tripping in, which allows the adjusted hook load to be used for drilling operations and in lateral or deviated portions of the wellbore.

Example System

Figure 1:
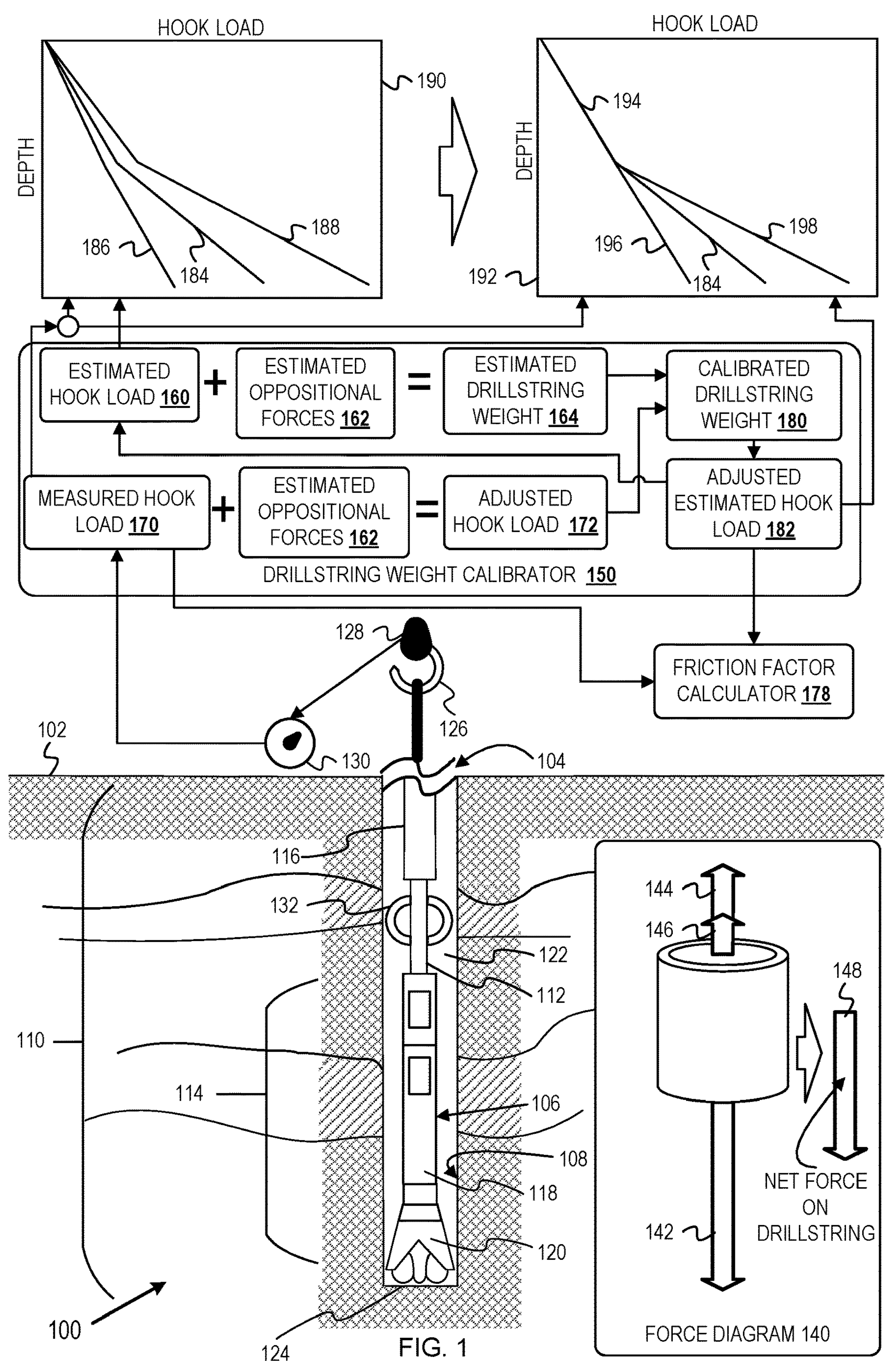
FIG. 1 depicts an example system for estimated hook load calibration, according to some embodiments.

FIG. 1 depicts an example system for estimated hook load calibration, according to some embodiments. FIG. 1 includes a schematic diagram of an example drilling apparatus 100, including a drill bit 120 in a wellbore 108, a drillstring weight calibrator 150, a drillstring force diagram 140, and a friction factor calculator 178.

Drilling of oil and gas wells is commonly carried out using a string of drill pipes connected together so as to form a drillstring 106 that can be lowered through a rotary table into a wellbore 108. The drillstring 106 may operate to penetrate the rotary table for drilling the wellbore 108 through subsurface formations 110. The drillstring 106 may include a Kelly, drill pipe 112, and a bottom hole assembly (BHA) 114, perhaps located at the lower portion of the drill pipe 112. The example drilling apparatus 100 may also include a drilling rig located at the surface 102 of a well 104, where the drilling rig is not shown here for simplicity. The drilling rig can include a hook 126 and a traveling block 128 or other drillstring support or suspension mechanisms. The total force pulling down on the drillstring is measured as a hook load 130.

The force diagram 140 depicts the forces exerted on the drillstring 106 which are measured as the hook load 130. A gravitational force 142, which is the weight of the drillstring in air, pulls the drillstring 106 downward. A buoyancy force 144, generated by the wellbore fluid, pushes the drillstring 106 upward. An oppositional force 146 is also shown, which represents other oppositional forces, such as a piston force, a hydrodynamic force, a friction force due to centralizers, etc. The net or total force exerted on the drillstring 106 can be the sum of the individual forces and is depicted as a total force or a normal force 148. The normal force 148 can include the weight of the drillstring 106, frictional forces, and other downward and upward forces that alter the weight of the drillstring 106 experienced at the surface.

The hook load 130 can be measured during the course of drilling, at the hook 126 or another drillstring support. The hook load 130 can change as a result of various drilling events downhole. Therefore, the hook load 130 can be indicative of drill bit or BHA position (such as drill bit off bottom, set-down or slack-off, pick-up, etc.) and drilling events (such as formation kick, wellbore fluid influx, etc.). Additionally, the hook load 130 can be correlated with drilling conditions and parameters (such as rotations per minute (RPM), weight on bit (WOB), torque on bit (TOB), rate of penetration (ROP), etc.).

The BHA 114 may include drill collars 116, a down hole tool 118, and a drill bit 120. The drill bit 120 may operate to create a wellbore 108 by penetrating the surface 102 and subsurface formations 110. The down hole tool 118 may comprise any of a number of different types of tools including a mud pump, MWD tools, LWD tools, and others. The drillstring 106 can also include one or more centralizer 132. The centralizer 132, which can also be any other type of standoff device, can operate to center the drillstring 106 in the wellbore 108. The centralizer 132 can also operate to facilitate cementing operations (i.e., be a turbolizer, cementing basket, etc.), facilitate a hydraulic fracturing (i.e., "fracking") operation such a perforation, operate as a packer or other wellbore separation device, etc. The centralizer 132 can alternatively or additionally be installed on the BHA 114.

During drilling operations, a mud pump may pump drilling fluid (sometimes known by those of ordinary skill in the art as "drilling mud") from a mud pit through a hose into the drill pipe and down to the drill bit 120. The drilling fluid can flow out from the drill bit 120 and be returned to the surface 102 through an annular area 122 between the drill pipe 112 and the sides of the wellbore 108. The drilling fluid may then be returned to the mud pit, where such fluid is filtered. In some embodiments, the drilling fluid can be used to cool the drill bit 120, as well as to provide lubrication for the drill bit 120 during drilling operations. Additionally, the drilling fluid may be used to remove subsurface formation 110 cuttings created by operating the drill bit 120.

During drilling operations, the drillstring 106 (perhaps including the Kelly, the drill pipe 112, and the BHA 114) may be rotated by the rotary table. In addition to, or alternatively, the BHA 114 may also be rotated by a motor (e.g., a mud motor) that is located down hole. The drill collars 116 may be used to add weight to the drill bit 120. The drill collars 116 may also operate to stiffen the BHA 114, allowing the BHA 114 to transfer the added weight to the drill bit 120, and in turn, to assist the drill bit 120 in penetrating the surface 102 and subsurface formations 110.

The drill bit 120 can contact a bottom 124 (of a vertical wellbore) or lateral end (of a lateral wellbore) of the wellbore 108 in order to advance the progress of the wellbore drilling. The efficiency of drilling and the forces on the drill bit 120 and the BHA 114 are affected by the position of the drill bit 120 relative to the bottom 124 of the wellbore 108. Depth of the drill bit 120 in the wellbore can be measured by the length of the drillstring 106 or other parameters at the surface 102, but in cases where the drill bit 120 experiences vibrations or non-idealities such as axial displacement, bending, stick-slip, etc. the drill bit 120 can come into and out of contact with the bottom 124 of the wellbore 108 during drilling and can also experience fits and starts in rotational movement. The hook load 130 can function as a measure of drill bit 120 contact with the bottom 124 of the wellbore 108 and of rotational friction (i.e., static friction versus kinetic friction, torque, etc.).

The drillstring weight calibrator 150 can operate on an estimated hook load 160 and measured hook load 170. In some embodiments, the drillstring weight calibrator 150 can generate the estimated hook load 160 based on knowledge of the drillstring components. The drillstring weight calibrator 150 can determine estimated oppositional forces 162. The estimated oppositional forces 162 can include a buckling stability force or other measure of buoyancy, a piston force, a hydrodynamic force, etc. The estimated oppositional forces 162 can vary based on the wellbore geometry and drillstring configuration, for example the presence of inner and outer drillstring components or can vary based on approximations used. For example, in a soft string model oppositional forces due to casing since can be neglected while such forces are included in a rigid string model.

The drillstring weight calibrator 150 can determine an estimated drillstring weight 164, such as by adding the value of the estimated oppositional forces 162 to the estimated hook load 160. In some embodiments, the drillstring weight calibrator 150 can directly determine the estimated drillstring weight 164. The drillstring weight calibrator 150 can determine an adjusted hook load 172 by adding the value of the estimated oppositional forces 162 to the measured hook load 170. Based on a relationship between the estimated drillstring weight 164 and the adjusted hook load 172, the drillstring weight calibrator 150 can determine a calibrated drillstring weight 180. The relationship between the estimated drillstring weight 164 and the adjusted hook load 172 can include calculation of a ratio between the slopes of the estimated drillstring weight 164 and the adjusted hook load 172. Based on the calibrated drillstring weight 180, the drillstring weight calibrator can determine an adjusted estimated hook load 182.

The friction factor calculator 178 can determine a friction factor for the drilling operation based on the adjusted estimated hook load 182 and the measured hook load 170. The drillstring weight calibrator 150 can be included in the friction factor calculator 178 or in communication with the friction factor calculator 178. In some embodiments, the drillstring weight calibrator 150 can also obtain one or more of the estimated hook load 160, the estimated oppositional forces 162, and the estimated drillstring weight 164 from another calculator or estimator.

Friction Factor

For a surface experiencing friction (either static or kinetic) with another surface, the friction force is related to the normal force by the friction factor (FF) or coefficient of friction (μ) by Equation 1, below:

$$F_f = \mu F_N = FF * F_N \tag{1}$$

where $F_f$ is the friction force and $F_N$ is the normal force, or force exerted by each surface upon the other at a direction normal (e.g., perpendicular) to the surface. If only gravity and friction are accounted for, for a drillstring in the vertical section of the wellbore the normal force is given by the weight of the drillstring. A friction force as given by Equation 1 (above) reduces the measured weight of the drillstring from the actual weight of the drillstring, as shown in Equation 2 (without friction) and Equation 3 (with friction), below:

$$\text{WEIGHT OF DRILLSTRING} = F_N = F_g = g * \text{MASS OF DRILLSTRING} \tag{2}$$

$$\text{MEASURED DRILLSTRING WEIGHT} = F_g - F_f = F_g - FF * F_N = F_N = \text{HOOK LOAD} \tag{3}$$

where g is the gravitational acceleration and $F_g$ is the force exerted on the drillstring mass by gravity.

For a drillstring suspended in a wellbore, the hook load is a measure of drillstring weight. Based the actual weight of the drillstring and the measured weight of the drillstring, where the measured weight of the drillstring is the hook load, the friction factor can then be solved for as shown in Equations 4 and 5, below:

$$\text{HOOK LOAD} = F_g - FF * F_N = F_N \tag{4}$$

-continued $$FF = \frac{\text{WEIGHT OF DRILLSTRING} - \text{HOOK LOAD}}{\text{HOOK LOAD}} \tag{5}$$

For most wellbores, the drillstring is not suspended in air but rather immersed in one or more fluid. The wellbore can contain one or more drilling fluids which exert a buoyant force on the drillstring, flowing fluids which can exert hydrodynamic pressure, one or more shoulders or inner tubes which can generate piston forces, etc. which change the normal force exerted on the wellbore. These and other forces effect the normal force of the drillstring, measured as the hook load. The relationship can be visualized using Equation 6, below:

$$\text{HOOK LOAD} = F_g - F_{bsf} - F_{hd} - F_{piston} - F_{misc} - F_f = F_N \tag{6}$$

where $F_g$ is the weight of the drillstring in air, $F_{bsf}$ is the buckling stability force or another measure of buoyancy, $F_{hd}$ is the force exerted by fluid movement or drilling mud circulation, $F_{piston}$ is any piston force created by drillstring diameter changes, $F_{misc}$ represents other miscellaneous forces, $F_f$ is the friction force, and $F_N$ is the normal force exerted by the drillstring on the wellbore. The buckling stability force, hydrodynamic force, piston force, miscellaneous forces, and friction forces are shown as reducing the weight of the drillstring because they generally reduce the hook load but could increase the hook load—for example a piston force due to a difference in pipe diameter at a tool joint can increase hook load on a trip out. For simplicity, forces other than the weight of the drillstring in air (i.e., $F_g$) and friction force (e.g., $F_f$) can be represented as ΔF. Then Equation 6 can be represented by Equation 7, below:

$$\text{HOOK LOAD} = F_g - \Delta F - F_f = F_N \tag{7}$$

where ΔF can be any force which influences hook load.

Substituting Eq. 1 into Eq. 7 gives the Equation 8, below:

$$\text{HOOK LOAD} = F_g - \Delta F - F_f = F_N \tag{8}$$

which can be rearranged to give a value of friction factor as shown by Equation 9, below:

$$F_g - \Delta F - FF * F_N = F_N \tag{9}$$

$$FF = \frac{F_g - \Delta F - F_N}{F_N} \tag{10}$$

$$FF = \frac{\text{WEIGHT OF DRILLSTRING} - \Delta F - \text{HOOK LOAD}}{\text{HOOK LOAD}} \tag{11}$$

An estimated hook load can be used to instead of the weight of the drillstring in air and can account for any other wellbore forces, as shown in Equation 12, below:

$$\text{ESTIMATED HOOK LOAD} = F_g - \Delta F = \text{WEIGHT OF DRILLSTRING} - \Delta F \quad (12)$$

If the weight of the drillstring (e.g., the weight of the drillstring in air) and wellbore forces (i.e., ΔF) are exactly know, then the friction factor (FF) can be calculated directly from the estimated drillstring weight, such as using Equation 13, below:

$$FF = \frac{\text{ESTIMATED HOOK LOAD} - \text{HOOK LOAD}}{\text{HOOK LOAD}} \quad (13)$$

However, if the weight of the drillstring or the forces are not known or are incorrectly calculated or estimated, then calculations of friction factor can contain inaccuracies introduced by the calculations included within the estimated drillstring weight.

In vertical portions of the wellbore, the normal force between the drillstring and the walls of the wellbore (e.g., casing, open hole, etc.) can be assumed to be zero. Therefore, in the vertical or substantially vertical portion of the wellbore the estimated hook load can be approximated to be equal to the hook load, as shown by Equation 14, below:

$$\text{ESTIMATED HOOK LOAD} \approx \text{HOOK LOAD} \quad (13)$$

where the friction factor is also approximately zero.

The hook load, which can encompass both the drillstring weight in air and other force calculations, such as buoyancy, hydrodynamic force, etc., can be used to account for differences between predicted or estimated drillstring mass (and therefore drillstring weight in air) and other force variations from calculations.

Because calculation of the friction factor depends directly on the estimated hook load (including gravitational and other forces), it is important for accuracy of the friction factor that the estimated hook load accurately represent the normal force exerted by the drillstring on the wellbore. Traditionally, the estimated hook load can be adjusted or calibrated to account for wellbore non-idealities using a general force adjustment (i.e., a $\pm\Delta F_{adjust}$) or various forces (such as $F_{bsf}$, $F_{hd}$, $F_{piston}$, etc.) can be adjusted individual to account for non-idealities. A one-time force addition can fail to account for ongoing misalignment of the estimated or calculated parameters (both drillstring weight in air and oppositional forces) with the real-world or actual parameters. In some cases, a single estimated hook load is not calculated, but rather an upper and lower bound are calculated for estimated hook load. Uncertainty in estimated hook load translates to uncertainty in friction factor for horizontal portions of the wellbore and for active drilling in vertical sections.

Adjusted Drillstring Weight

In order to compensate for both discrepancies in the drillstring weight in air and in oppositional forces, an adjusted drillstring weight can be calculated which takes into account buoyancy and other forces and is adjusted or calibrated for measured hook load.

Based on knowledge of the weight of individual components of the drillstring (i.e., drill bit, tools, drillstring subs, drill pipe, etc.) an approximate drillstring weight in air can be calculated. Based on knowledge of the fluid (e.g., density, viscosity, etc.), a buckling stability force can be calculated.

Buckling Stability Force

The buoyancy force for a drillstring in a fluid with a known interior pressure and known exterior pressure can be estimated using the equation for buckling stability force as shown in Equation 14, below:

$$F_{bsf} = p_e A_e - p_i A_i \quad (14)$$

where $F_{bsf}$ is the buckling stability force, which is the buoyant force on a drill pipe modeled as soft string in a fluid, $p_e$ is the external pressure, $A_e$ is the external cross-sectional area, $p_i$ is the internal pressure, and $A_i$ is the internal cross-sectional area.

For a trip in procedure with no pipe rotation or flow rate, the estimated hook load can then be approximated using Equations 15-17, below:

$$\text{ESTIMATED HOOK LOAD} = F_g - \Delta F \quad (15)$$

$$\Delta F = F_{bsf} = p_e A_e - p_i A_i \quad (16)$$

$$\text{ESTIMATED HOOK LOAD} = F_g - p_e A_e + p_i A_i \quad (17)$$

where $F_g$ is the weight of the drillstring in air, $F_{bsf}$ is the buckling stability force or the reduction in the weight of the drillstring due to buoyancy (i.e., the presence of wellbore fluid). The buckling stability force can be determined by the pressure outside the drillstring $p_e$ (external pressure), external cross-sectional area of the drillstring $A_e$, pressure inside the drillstring $p_i$ (internal pressure), and internal cross-sectional area of the drillstring $A_i$, according to a soft sting model.

In some embodiments, a correction to the weight of the drillstring in air can be generated based on the measured hook load. This correction, which produces an adjusted drillstring weight based on the estimated hook load, can account for miscalculation or misestimation of weight of the drill sting in air—due to under or over reported component weights. Additionally, the adjusted drillstring weight can account for miscalculation or misestimation of wellbore forces—i.e., buoyancy due to one or more wellbore fluids, pump off force, pressure differential force, piston force for nested strings, etc.

The adjusted drillstring weight can be calculated based on the measured hook load in a vertical or substantially vertical portion of the well where the friction factor is approximately zero. In this region, Eq. 13 should apply. If Eq. 13 is not approximately accurate, due to miscalculation or non-idealities an adjusted drillstring weight can be calculated using Equations 18-20, below:

$$\text{ESTIMATED HOOK LOAD} \neq \text{HOOK LOAD} \quad (18)$$

$$\text{ADJUSTED DRILLSTRING WEIGHT} \approx \text{HOOK LOAD} \quad (19)$$

$$F'_g = p_e A_e + p_i A_i \approx \text{HOOK LOAD} \quad (20)$$

where $$F'_g$$

is the adjusted drillstring weight in air (i.e., the force of gravity on the mass of the drillstring).

The adjusted drillstring weight can be calibrated based on the measured hook load between two fulcrum or inflection points. The hook load tends to vary linearly with depth (a drillstring with centralizers is a separate case and will be discussed in detail later), as hook load increases per unit of drillstring added to the wellbore and as buoyancy force also increases linearly with depth. When the drillstring weight or other characteristic changes, the slope of the hook load can change. For example, when a drillstring is comprised of similar sections of drill pipe the drillstring weight in air (and consequently estimated drillstring weight) can be expected to increase at a first rate, such as in lbs per feet of drillstring. If a second type of drill pipe, such as a different diameter drillpipe, is added to the drillstring, the rate at which hook load increases with depth in the wellbore can be expected to change. For each drillstring type, the estimated drillstring weight increases as the drillstring lengthens but the rate at which the drillstring weight increases can be different. This can be reflected in a variation in the slope of the hook load as measured and a variation in the slope of the estimated drillstring weight as calculated. The points or depths at which the slope of either the estimated drillstring weight or the measured hook load change can be considered fulcrum or inflection points. Additionally, a zero depth or the depth at which the drillstring enters the wellbore can be considered a first fulcrum point. Fulcrum points in the measured hook load and the estimated drillstring weight should occur at the same depth but can be offset in depth if the unexpected forces or changes occur in the wellbore—for example an influx of wellbore fluid from the formation can change the drill mud weight and therefore effect the buckling stability force—or if the estimated drillstring weight does not reflect the actual drillstring component length or composition.

Returning to FIG. 1, FIG. 1 also includes a graph 190 depicts a lower bound 186 and an upper bound 188 for the estimated hook load 160 calculated without calibration of the drillstring weight as a function of depth. The graph 190 includes a line 184 representing the measured hook load 170 as a function of depth. A graph 192 depicts a line 194 representing the adjusted estimated hook load 182 as a function of depth between a first fulcrum point (at a depth of zero) and a second fulcrum point. The line 194 overlays the line 184 representing the measured hook load 170. The graph 192 also depicts a lower bound 196 and an upper bound 198 for the estimated hook load 160 calculated based on the adjusted estimated hook load 182 for the depths below the second fulcrum point. It should be understood that iteration according to various embodiments can further adjust the calibrated drillstring weight 180 and therefore the adjusted estimated hook load 182 in order to bring the adjusted estimated hook load 182 in line with the measured hook load 170 for depths below the second fulcrum point.

Various methods exist for calibrating an estimated drillstring weight based on a measured hook load. However, a reliable, coherent calibration method which can be automated and can be adjusted iteratively is not agreed upon in the art. A method for calibrating adjusted drillstring weight is provided which is reliable, consistent with wellbore physics and forces, based on measured hook load, iterative, and automatable. Various embodiments of the method provide for a calibrated adjusted drillstring weight and friction factor calculation for different wellbore operations and drillstring arrangements.

In various embodiments, an adjusted drillstring weight is calibrated which improves the estimated drillstring weight and friction factor calculation. By calibrating the adjusted drillstring weight, uncertainty in drillstring weight and wellbore forces present in a vertical wellbore can be removed from the friction factor. This can improve the friction factor responsiveness to drilling factors and increase the responsivity of the friction factor to drilling functions occurring downhole. The friction factor calculation can be used to monitor various drilling operations, i.e., for drill bit performance, for formation factors, etc., and is more useful for monitoring a drilling operation when calibrated correctly—i.e., with drillstring weight, buoyancy force factors, etc. removed.

Trip In Operation Without Rotation or Flow

For a trip in operation, without drillpipe rotation or fluid flow, the estimated drillstring weight can be calculated based on known or manufacturer provided drillstring component weights (and, optionally, lengths). An estimated hook load can be calculated based on the estimated drillstring weight and a force reduction due to buoyancy of the drillstring in the wellbore or drilling fluid. The buoyancy force can be calculated using the buckling stability force or other appropriate force calculation. The estimated drillstring weight, which is the force based on the estimated drillstring mass, can be converted to and from the estimated hook load, which includes both the estimated drillstring weight and estimated oppositional forces. The estimated hook load can be plotted together with the measured hook load on a broomstick or other plot as a visual representation of the drilling operation.

An adjusted drillstring weight can be calibrated based on the estimated drillstring weight and the measured hook load. First, the estimated hook load is determined. The estimated hook load can be determined from first principles based on an estimated drillstring weight and estimated oppositional forces. The estimated hook load can also be received or obtained from another estimator, calculator, or program. From the estimated hook load, the estimated drillstring weight in air can be determined. The estimated hook load and the estimated drillstring weight in air are related by Eq. 17 for a single drillstring without rotation or flow. Eq. 17 can also be written as Equation 21 or 22, below:

$$\text{ESTIMATED HOOK LOAD} = F_g - p_e A_e + p_i A_i \tag{17}$$

$$\text{ESTIMATED HOOK LOAD} = \text{ESTIMATED DRILLSTRING WEIGHT} - F_{bsf} \tag{21}$$

$$\text{ESTIMATED DRILLSTRING WEIGHT} = \text{ESTIMATED HOOK LOAD} + F_{bsf} \tag{22}$$

where $F_g$ is the estimated drillstring weight in air and $p_e A_e - p_i A_i$ is the buckling stability force $F_{bsf}$. The estimated hook load and the estimated drillstring weight can be determined for each depth of the drillstring in the wellbore.

An adjusted hook load can also be determined based on the measured hook load and the estimated oppositional forces. The adjusted hook load represents the drillstring weight in air that would produce the measured hook load based on the estimated buoyancy force. The adjusted hook load can be calculated using Equations 23 or 24, below:

$$\text{ADJUSTED HOOK LOAD} = \text{HOOK LOAD} + F_{bsf} \tag{23}$$

-continued $$\text{ADJUSTED HOOK LOAD} = \text{HOOK LOAD} + p_eA_e - p_iA_i \quad (24)$$

where hook load is the measured hook load. The adjusted hook load can be determined for each depth of the drillstring in the wellbore.

The weight of the drillstring in air is then calibrated based on the estimated hook load and the adjusted hook load. A calibrated drillstring weight is determined based on the value of the estimated drillstring weight at a second fulcrum point, the slope of the estimate drillstring weight between a first fulcrum point and the second fulcrum point, the value of the adjusted hook load at the second fulcrum point, and the slope of the adjusted hook load between the first fulcrum point and the second fulcrum point. This gives the relationship shown in Equations 25-27, below:

$$\text{CALIBRATED DRILLSTRING WEIGHT} = \text{ESTIMATED DRILLSTRING WEIGHT} * \frac{\text{SLOPE OF ADJUSTED HOOK LOAD}}{\text{SLOPE OF ESTIMATED DRILLSTRING WEIGHT}} \quad (25)$$

$$\text{CALIBRATE DRILLSTRING WEIGHT} = F_g * \frac{\text{SLOPE OF (HOOK LOAD} + p_eA_e - p_iA_i)}{\text{SLOPE OF } F_g} \quad (26)$$

$$F'_g = F_g * \frac{\text{SLOPE OF (HOOK LOAD} + F_{bsf})}{\text{SLOPE OF } F_g} \quad (27)$$

where the estimated drillstring weight is the estimated drillstring weight in air and the adjusted hook load is the measured hook load plus the bucking stability or buoyancy force. The slope of the estimated drillstring weight is the slope of the estimated drillstring weight in air and the slope of the hook load is the slope of the measured hook load plus the buckling stability or buoyancy force. The drillstring weight in air (i.e., $F_g$) can then be set to the calibrated drillstring weight in air $$F'_g$$

(in pounds or any appropriate unit of measurement). From the calibrated drillstring weight in air, a calibrated estimated hook load can be calculated using Eq. 17 or any other appropriate method. This can bring the estimated hook load in line with the measured hook load, where the calibrated drillstring weight in air accounts for any discrepancies in drillstring weight and other force calculations.

The friction factor can then be calculated using the estimated hook load as calibrated using the calibrated drillstring weight in air. Using the calibrated estimated hook load removes non-idealities which are not caused by drilling or drilling friction from calculations of friction factor. Calculation of a friction factor based on the calibrated estimated hook load, with forces causing variations between measured hook load and estimated hook load removed, is then given by Equations 28 or 29, below:

$$FF = \left| \frac{\text{ESTIMATED HOOK LOAD} - \text{MEASURED HOOK LOAD}}{\text{ESTIMATED HOOK LOAD}} \right| \quad (28)$$

-continued $$FF = \left| \frac{F'_g - F_{bsf} - \text{MEASURED HOOK LOAD}}{F'_g - F_{bsf}} \right| \quad (29)$$

In some cases, the drillstring weight or drillstring weight per unit of depth changes during run in (introduction of the drillstring to the wellbore) due to changes in the weight of the components—i.e., tubulars, subs, stands, drill pipe sections, inner tubular, outer tubular, etc. For this or any other reason, estimated hook load can be adjusted iteratively to account for each change in weight or weight per unit length as a function of depth, by using an iterative calibrated drillstring weight, such as that given by Equation 30, below:

$$\text{CALIBRATED DRILLSTRING WEIGHT}_{i+1} = \text{ESTIMATED DRILLSTRING WEIGHT}_i * \frac{\text{SLOPE OF ADJUSTED HOOK LOAD}}{\text{SLOPE OF ESTIMATED DRILLSTRING WEIGHT}_i} \quad (30)$$

where the estimated drillstring weight is calibrated for the (i+1) interval based on the estimated drillstring weight used for the $i^{th}$ interval and the slope of the adjusted hook load.

In various embodiments, the calibrated drillstring weight can be adjusted in real time, such as iteratively, in order to align with the measured hook load for substantially vertical portions of the wellbore. In various embodiments, fulcrum points can be selected at predetermined depths or changes in depth. Fulcrum points can be selected where the slope of the adjusted hook load, measured hook load, or estimated drillstring weight change—but change in slope can be limited by measurement limits (i.e., resolution limits, sampling rate, hook load recovery after addition of a stand of drillpipe, etc.). In order to account for under sampling and the like, fulcrum points can be created or treated as existing even when slope does not appear to change. Creation of larger numbers of fulcrum points (which can be used when discrete elements such as centralizers are included on the drillstring) can increase the iteration and adjustment of hook load, which can lead to an estimated hook load calculation hewing closely to the measured hook load. In various embodiments, a fulcrum point can be added or generated (even if slope does not appear to change) at a minimum change in depth. Calibration of the drillstring weight at minimum intervals can keep the estimated hook load from diverging too greatly from the measured hook load in wellbore sections where the hook load is increasing linearly. The calibration error can thus be minimized between slope changes, which can increase the accuracy of information supplied to an operator or controller.

Slope Calculation

The slope of the adjusted hook load can be calculated for a vertical portion of the well based on values of measured hook load, calculated oppositional forces, and depth at fulcrum points. The slope can be calculated using any appropriate method— example equations are shown as Equations 31 and 32, below:

$$\text{SLOPE OF ADJUSTED HOOK LOAD} = \frac{\Delta\text{ADJUSTED HOOK LOAD}}{\Delta\text{DEPTH}} \quad (31)$$

-continued $$\text{SLOPE OF ADJUSTED HOOK LOAD} = \frac{\text{ADJUSTED HOOK LOAD}_{i+1} - \text{ADJUSTED HOOK LOAD}_{i}}{\text{DEPTH}_{i+1} - \text{DEPTH}_{i}} \quad (32)$$

where hook load and depth for the deeper fulcrum point (i+1) and the shallower fulcrum point (i) are used to calculate the slope of the hook load or line between the two fulcrum points.

Likewise, the slope of the estimated drillstring weight can be calculated using any appropriate slope calculation method, such as example equations shown in Equations 33 and 34, below:

$$\text{SLOPE OF ESTIMATED DRILLSTRING WEIGHT} = \frac{d(\text{ESTIMATED DRILLSTRING WEIGHT})}{d(\text{DEPTH})} \quad (33)$$

$$\text{SLOPE OF ESTIMATED DRILLSTRING WEIGHT} = \frac{\text{ESTIMATED DRILLSTRING WEIGHT}_{i+1} - \text{ESTIMATED DRILLSTING } \mathit{WEIG}}{\text{DEPTH}_{i+1} - \text{DEPTH}_{i}} \quad (34)$$

where estimated drillstring weight and depth for the deeper fulcrum point (i+1) and the shallower fulcrum point (i) are used to calculate the slope of the line between the two fulcrum points.

Example Operations

Figure 2:
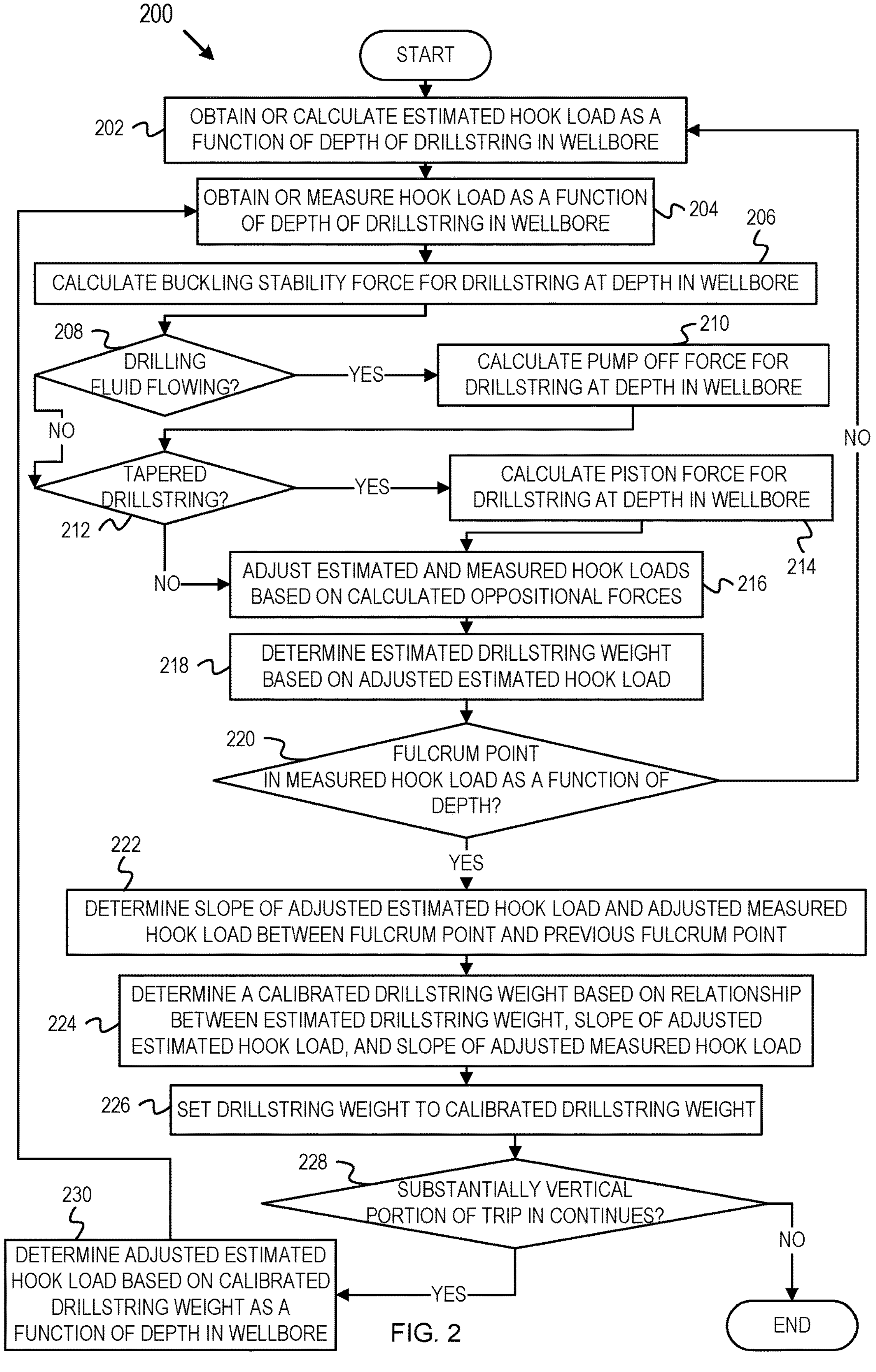
FIG. 2 depicts a flowchart of example operations for estimated hook load calibration, according to some embodiments.
Figure 3A:
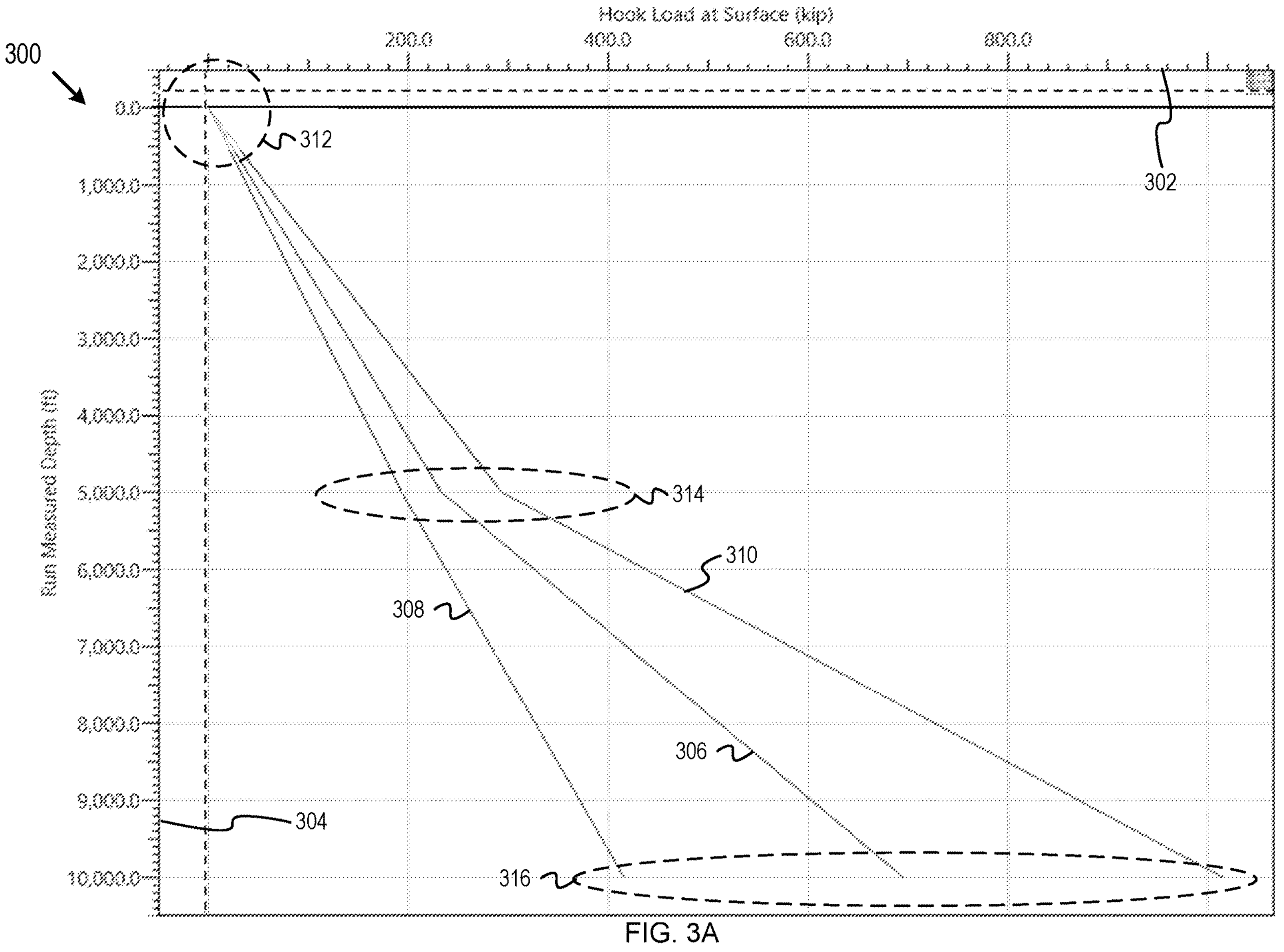
FIGS. 3A-3C depict example graphs of estimated hook load calibration as a function of depth, obtained during drilling according to some embodiments.
Figure 3B:
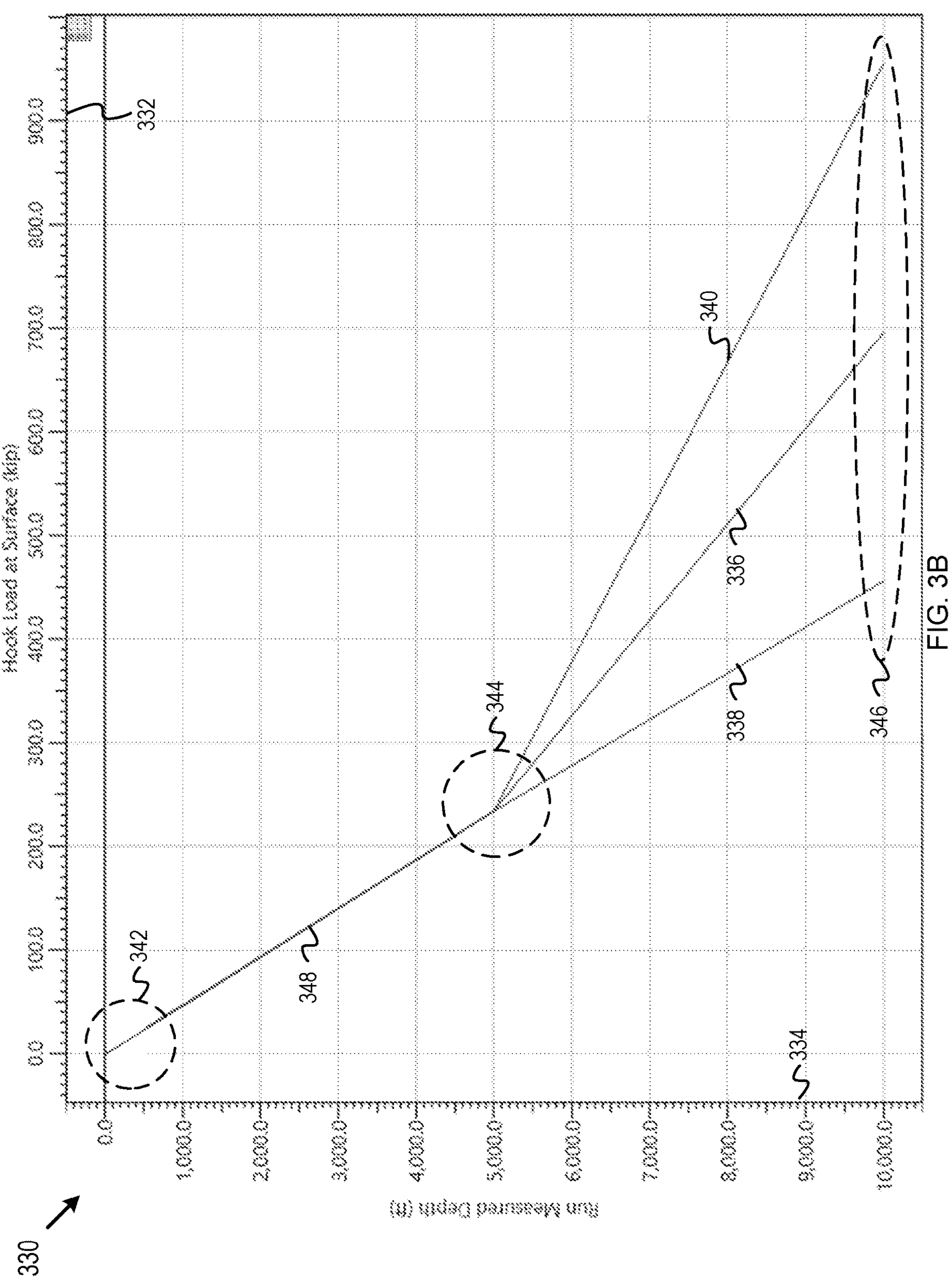
Figure 3C:
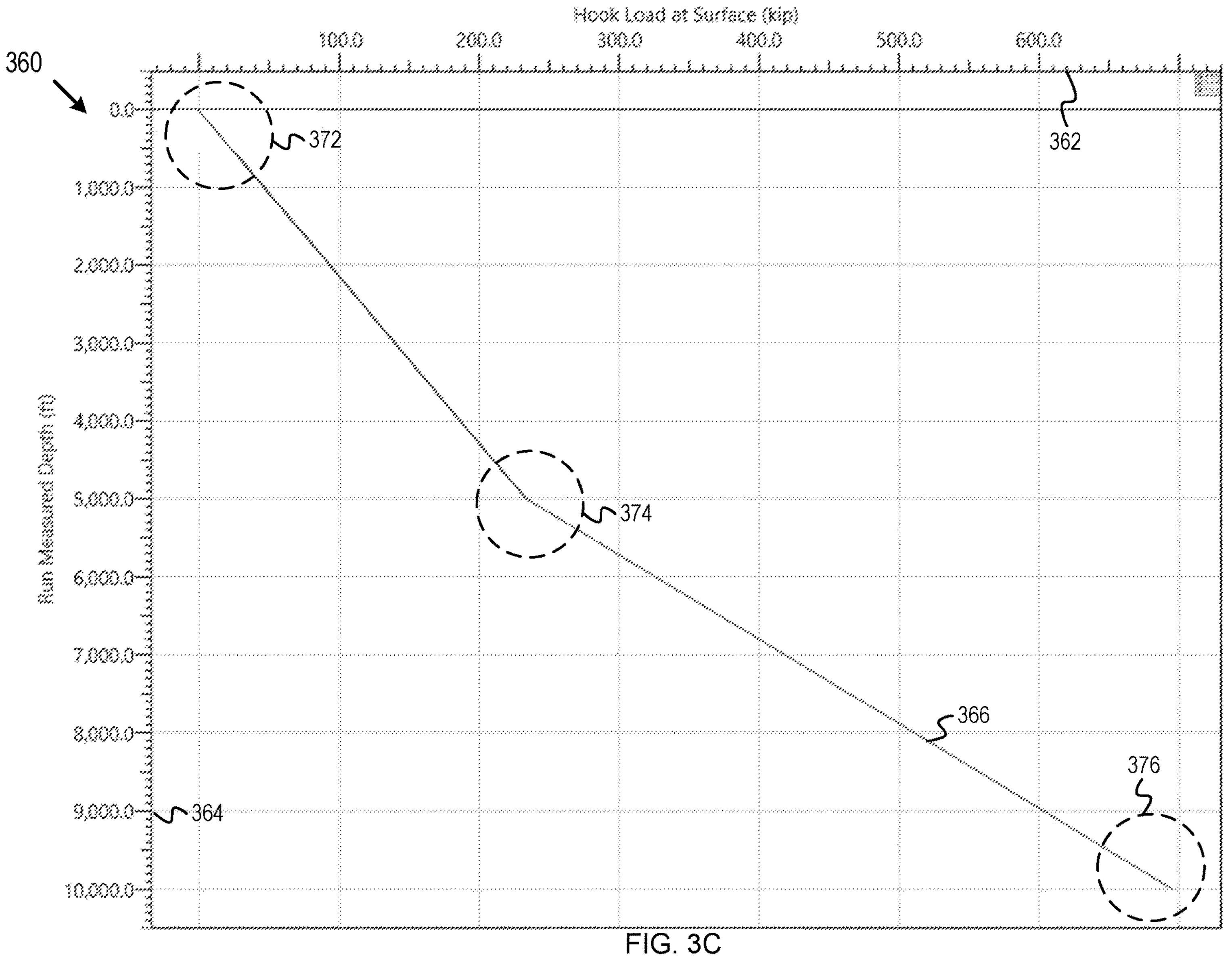
Figure 4A:
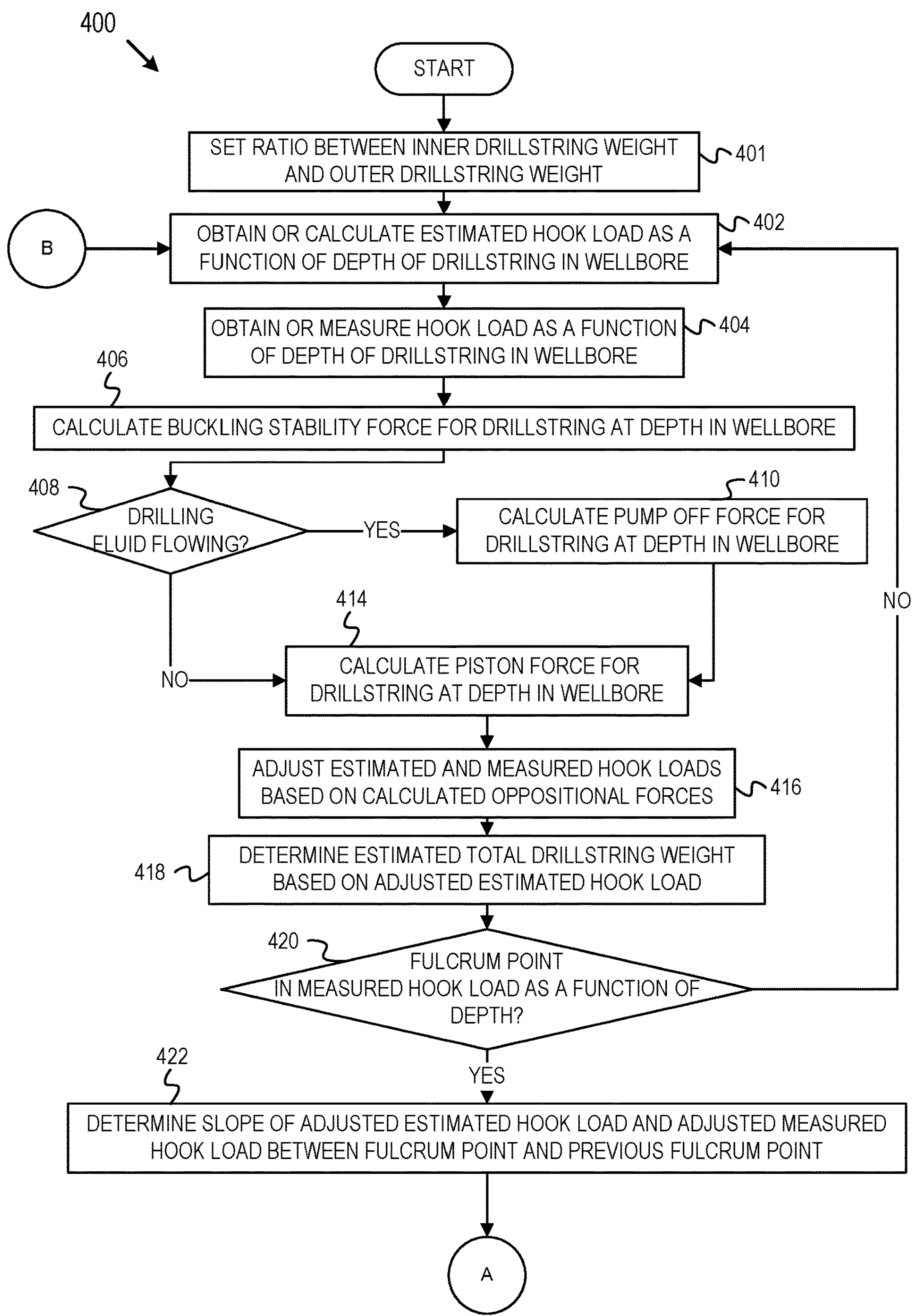
FIGS. 4A and 4B depict a flowchart of example operations for estimated hook load calibration including inner and outer drillstrings, according to some embodiments.
Figure 4B:
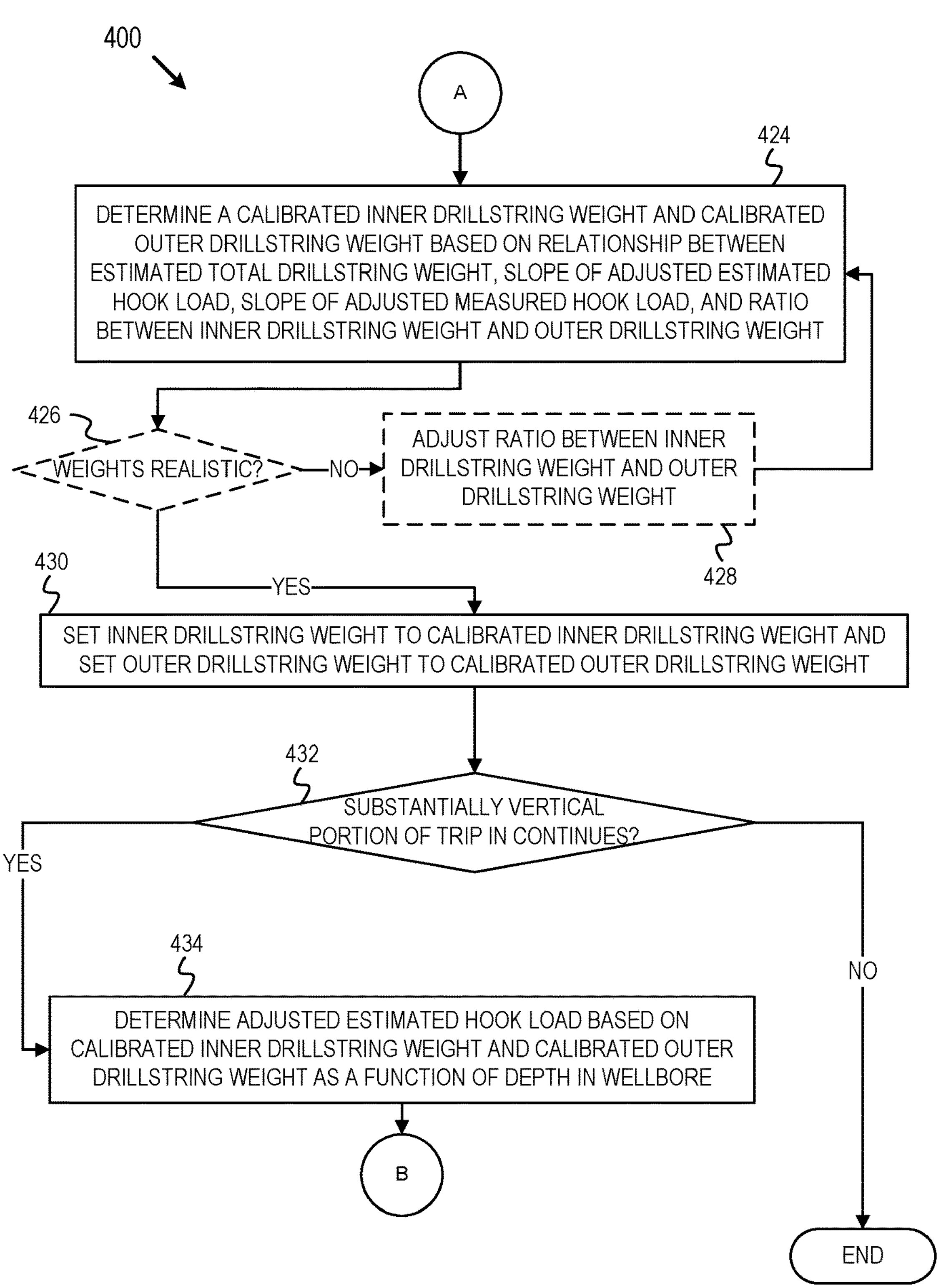
Figure 5:
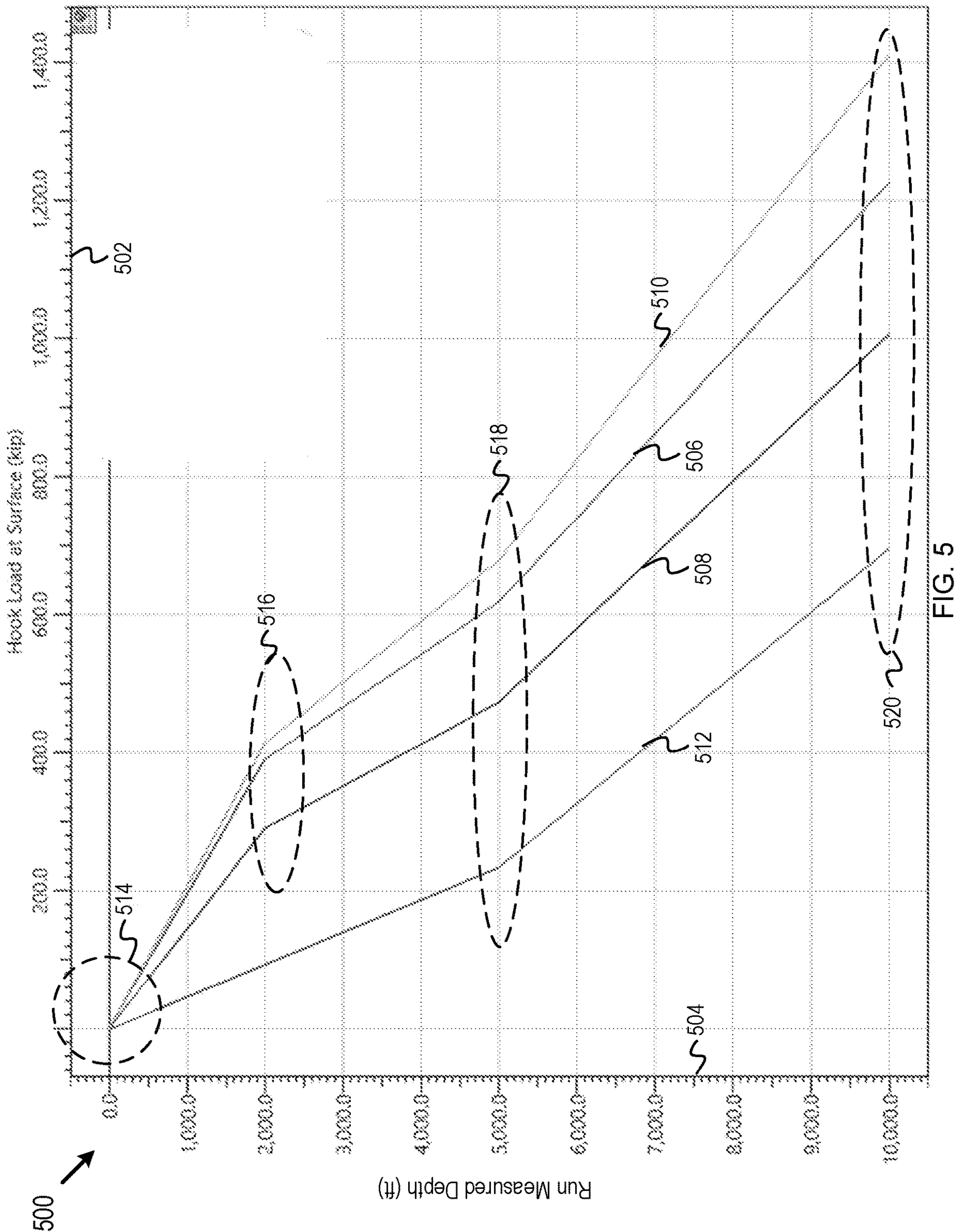
FIG. 5 depicts an example graph of estimated hook load as a function of depth for a drillstring comprising an inner string and an outer string, according to some embodiments.
Figure 6A:
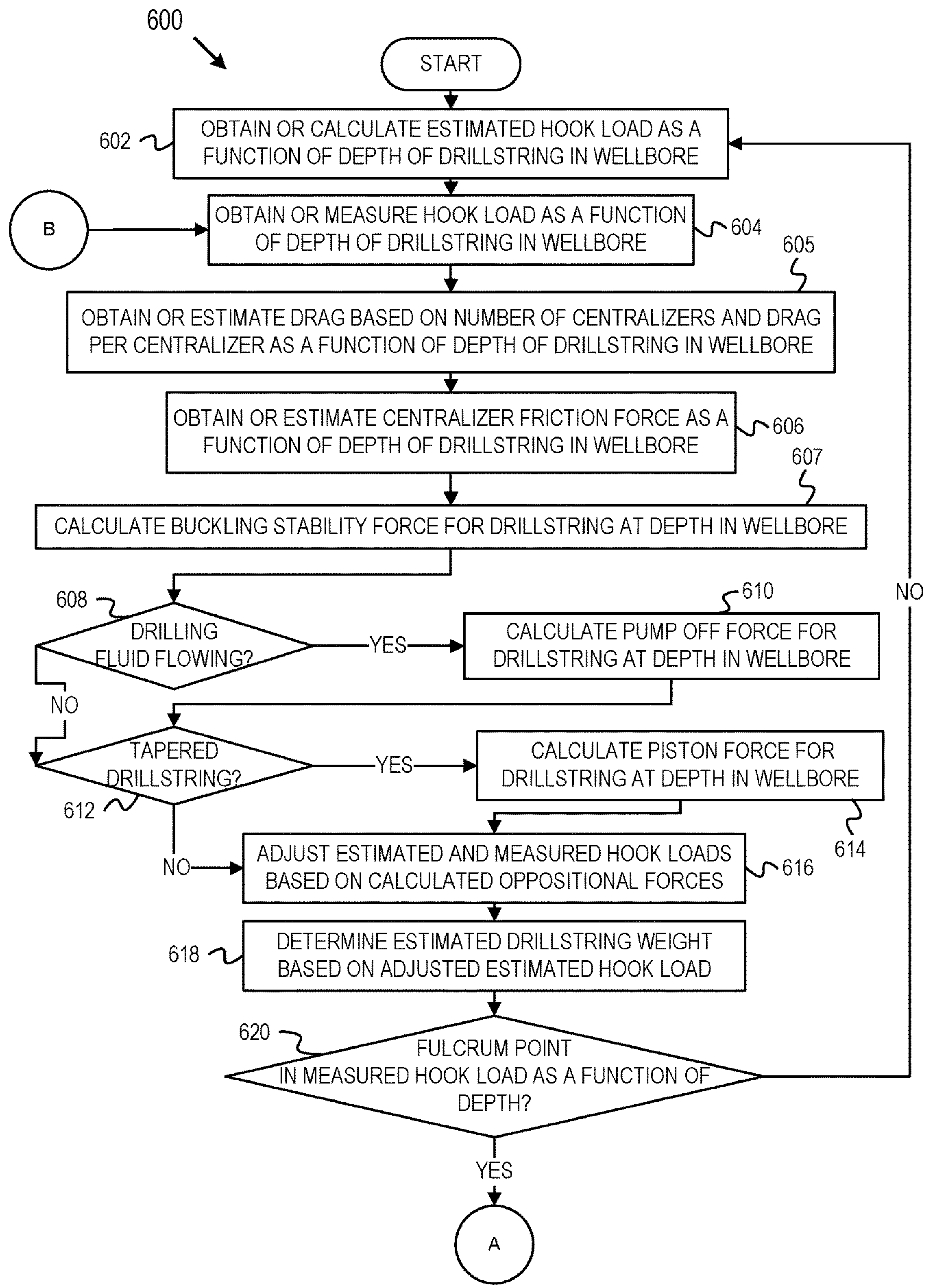
FIGS. 6A and 6B depict a flowchart of example operations for estimated hook load calibration including centralizer effects, according to some embodiments.
Figure 6B:
Figure 6B:
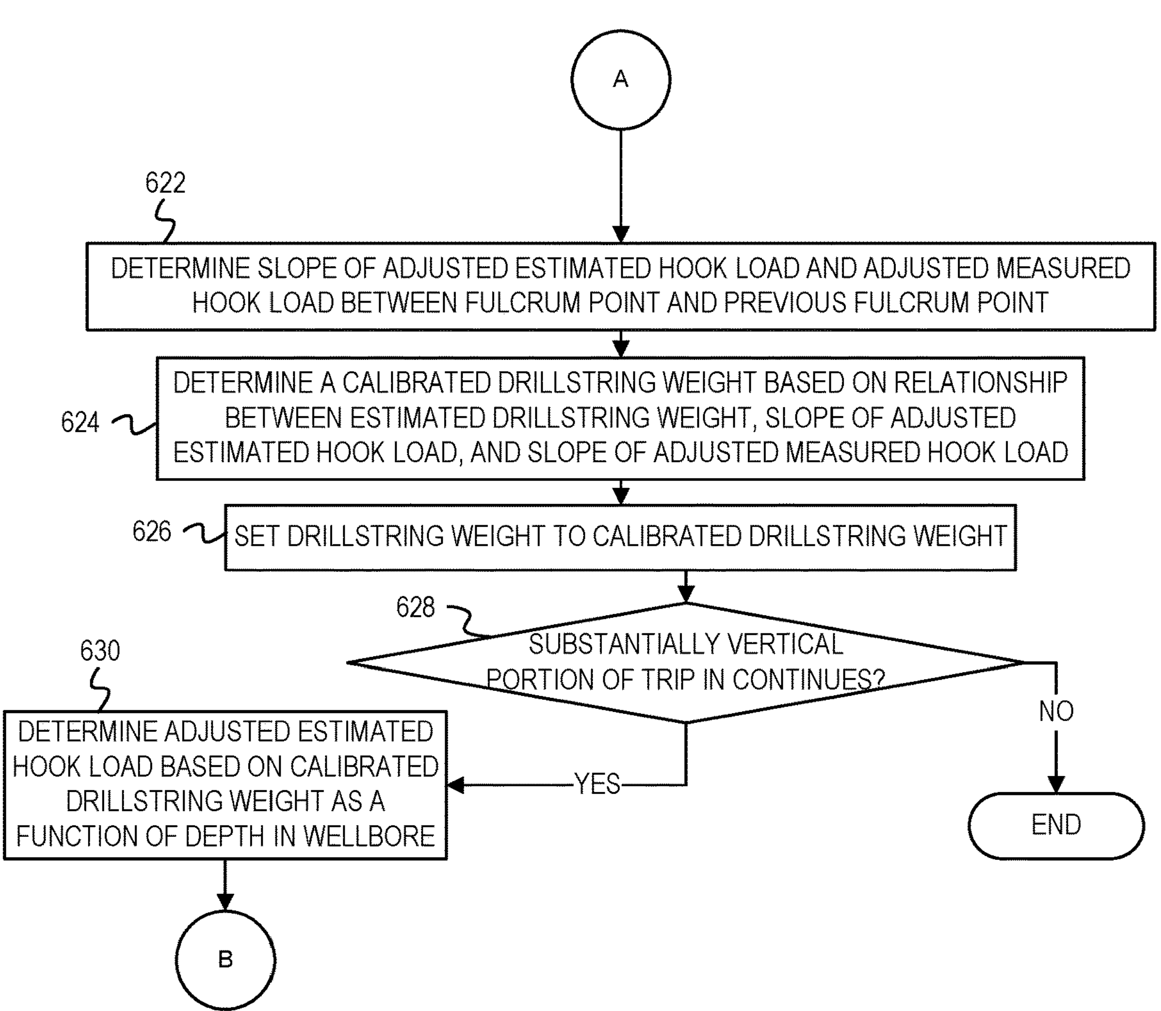
Figure 7:
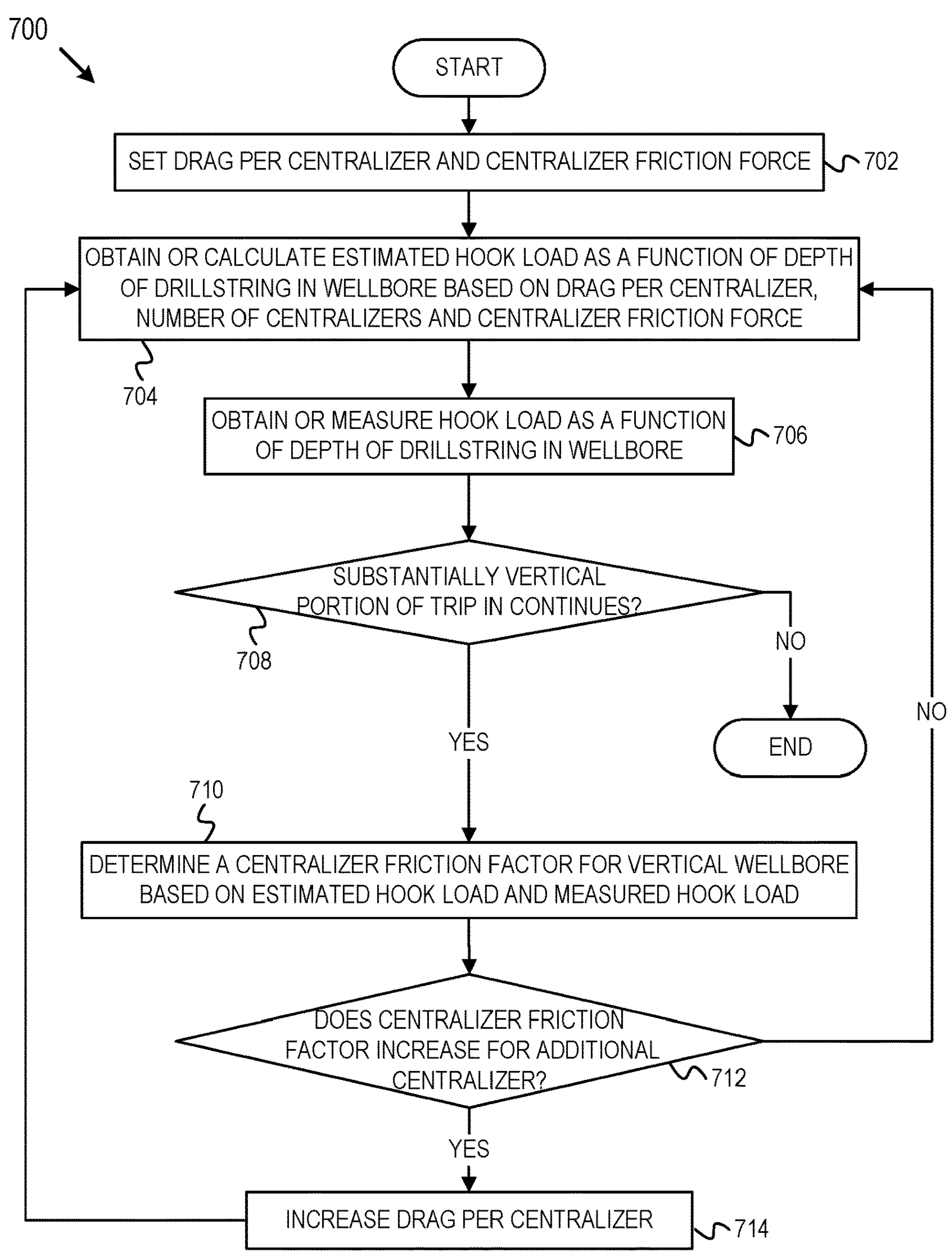
FIG. 7 depicts a flowchart of example operations for calculation and calibration of a centralizer running drag and friction factor, according to some embodiments.
Figure 8A:
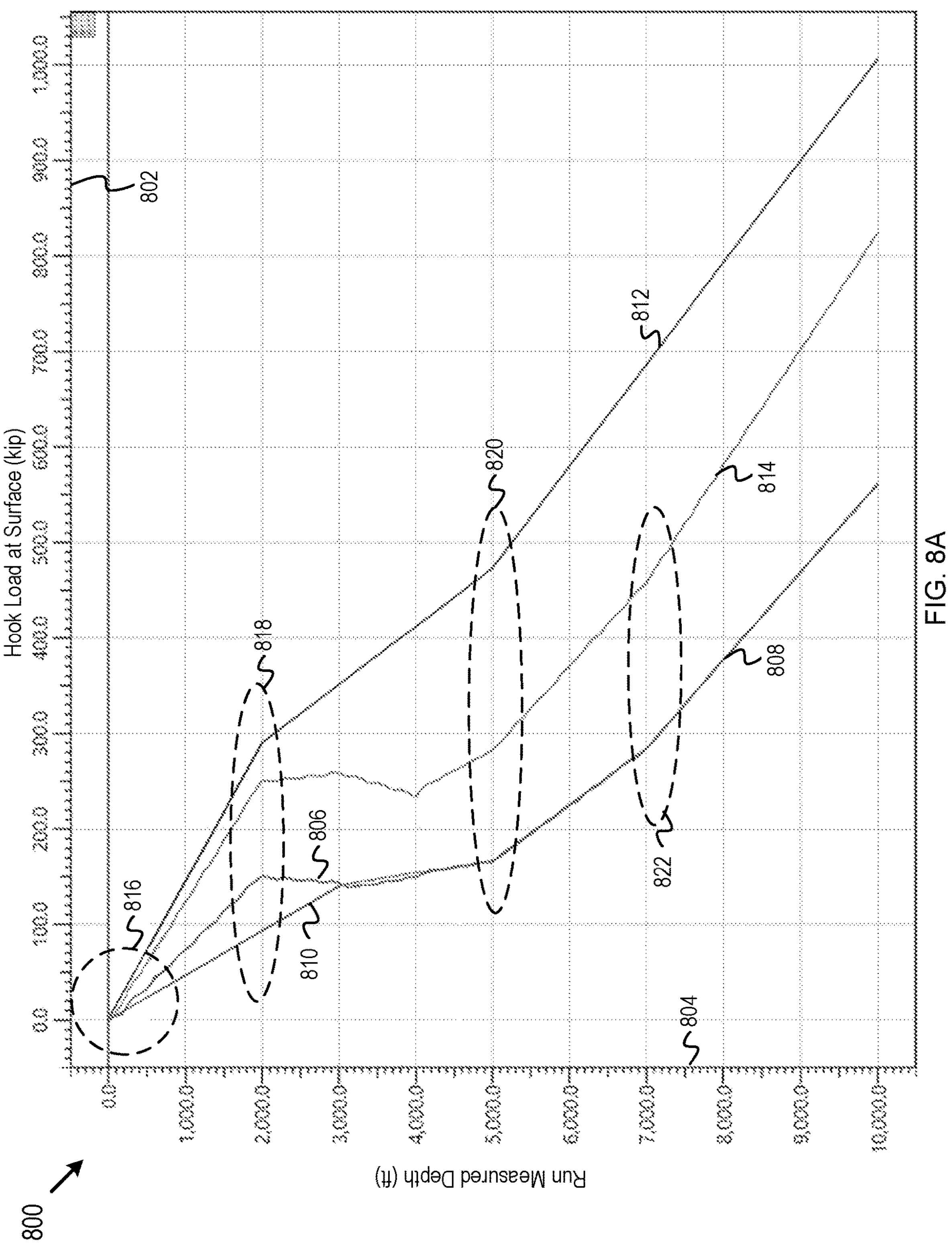
FIGS. 8A and 8B depict example graphs of hook load as a function of depth for a drillstring with centralizers, according to some embodiments.
Figure 8B:
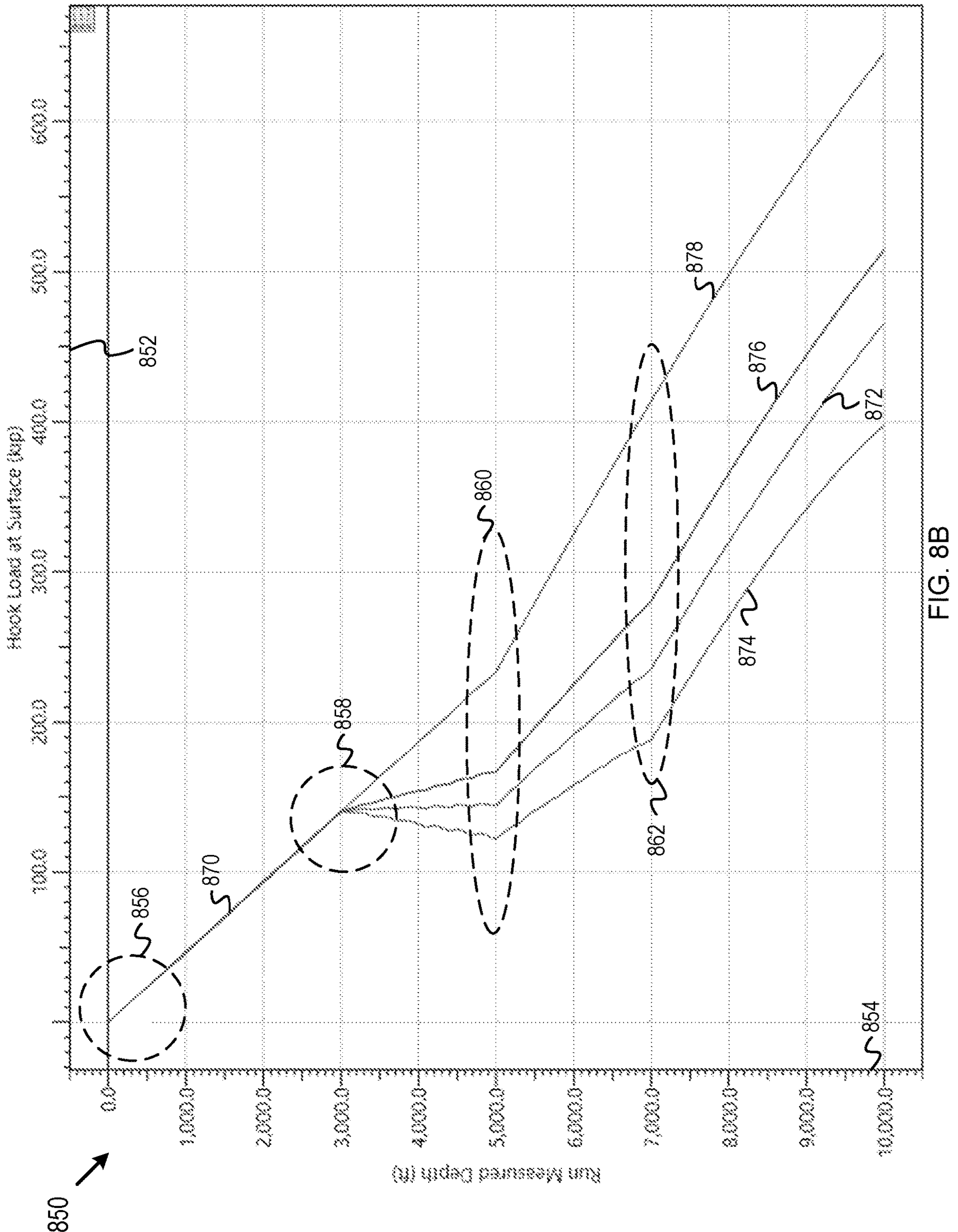

Example operations are now described in reference to FIGS. 2, 3A-3C, 4A-4B, 5, 6A-6B, 7, and 8A-8B. the apparatus of FIG. 1. FIG. 2 depicts a flowchart of example operations for estimated hook load calibrations for a drillstring, while FIGS. 3A-3C depict example graphs to aid in understanding the example operations of FIG. 2. FIGS. 4A and 4B depict a flowchart of example operations for estimated hook load calibration including inner and outer drillstrings, while FIG. 5 depicts an example graph to aid in understanding the example operations of FIGS. 4A-4B. FIG. 6 depicts a flowchart of example operations for estimated hook load calibrations for nested drillstrings. FIG. 7 depicts a flowchart of example operations for calculation and calibration of a centralizer running drag and friction factor, while FIGS. 8A-8B depict example graphs to aid in understanding the example operations of FIG. 7. Additionally, the example operations are described with reference to example system of FIG. 1.

FIG. 2 depicts a flowchart of example operations for estimated hook load calibration, according to some embodiments. A flowchart 200 of FIG. 2 includes operations described as performed by the drillstring weight calibrator 150 for consistency with the earlier descriptions. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 200 are described in reference to the example drilling apparatus 100 and the friction factor calculator 178 of FIG. 1. The flowchart includes the operations described as performed by the drillstring weight calibrator 150, but one or more of the operations may instead or additionally be performed by the friction factor calculator 178.

At block 202, estimated hook load is obtained or calculated as a function of depth of the drillstring in a wellbore. For example, the estimated hook load can be calculated based on the manufacturer supplied weight of the components which make up the drillstring, estimated based on hook load for a previously drilled drillstring in a similar wellbore, calculated based on approximated oppositional forces, etc. For example, with reference to FIG. 1, the drillstring weight calibrator 150 can calculate an estimated hook load 160. The estimated hook load 160 can also be obtained from a separate program or estimator or obtained from a previous run or wellbore with similar characteristics.

At block 204, hook load is obtained or measured as a function of depth of the drillstring in the wellbore. For example, with reference to FIG. 1, the measured hook load 170 can be obtained from the hook load 130 or an appropriate force measurement made at the hook 126 or the traveling block 128 of the example drilling apparatus 100. The measured hook load 170 can also be obtained from a separate program or measurement apparatus.

At block 206, a buckling stability force is calculated for the drillstring at the depth in the wellbore. For example, with reference to FIG. 1, the drillstring weight calibrator 150 can calculate the buckling stability force. The buckling stability force can be calculated using Eq. 14 or any appropriate method. Alternatively, a buoyancy force or another measure of buoyancy can be calculated instead of the buckling stability force.

At block 208, it is determined if drilling fluid is flowing. For example, with reference to FIG. 1, the drillstring weight calibrator 150 can determine if drilling fluid is flowing. Drilling fluid flow can be measured at the surface or another location, for example through with drilling mud return flowmeter. Drilling fluid flow can also be estimated or calculated based on a mud pump parameter, such as a voltage, frequency, or speed (e.g., rotations per minute). Any appropriate determination of drilling mud flow can be used.

At block 210, the pump off force is calculated for the drillstring at the depth in the wellbore. The pump off force can be determined based on a fluid flow rate, annular area, cross sectional area of a drillpipe, etc. using any appropriate method. Any appropriate method of pump off force calculation can be used.

At block 212, it is determined in the drillstring is tapered. For example, with reference to FIG. 1, the drillstring weight calibrator 150 can determine if the drillstring is tapered. Drillstring shoulders or profiles which can generate piston force can be determined from a drilling plan, by an operator at the kelly or rotary table, based on manufacturer specifications, etc.

At block 214, the piston force is calculated for the drillstring at the depth in the wellbore. The piston force can be determined based on knowledge of any shoulders or diameter changes in the drillstring and knowledge of fluids displaced by the drillstring. Any appropriate method of piston force calculation can be used.

At block 216, the estimated hook load and the measured hook load are adjusted based on the calculated oppositional forces. For example, with reference to FIG. 1, the drillstring weight calibrator 150 can calculate estimated oppositional force 162. The calculated oppositional forces can include the buckling stability force or another measure of buoyancy. The calculated can include a calculated pump off force, a calculated piston force, etc. It should be understood that additional oppositional forces can be calculated or determined in addition to the buckling stability force, the pump off force, and the piston force.

At block 218, an estimated drillstring weight is determined based on the adjusted estimated hook load. The estimated drillstring weight can be equal to the adjusted estimated hook load, or can include one or more additional force calculation, calibration, or adjustment.

At block 220, it is determined if there is a fulcrum point in measured hook load as a function of depth. For example, with reference to FIG. 1, the drillstring weight calibrator 150 can determine if there is a fulcrum point in measured hook load. The fulcrum point can be detected in the measured hook load or the adjusted measured hook load. The beginning of the measured hook load can be taken to be a first fulcrum point, whether the measured hook load is zero at zero depth, if the measured hook load is nonzero when the measurement starts, and/or if the measurement of the hook load begins at a nonzero depth. At any depth after the first fulcrum point, a second or additional fulcrum point can be detected. A fulcrum point can be detected as a change in the slope of the measured hook load or the adjusted hook load. A fulcrum point can be detected as a change in the first derivative of the measured hook load or the adjusted hook load. A fulcrum point can be detected as a change in the instantaneous slope of the measured hook load or the adjusted hook load. A fulcrum point can be predicted or anticipated based on knowledge of the drillstring composition or of a change in the drillstring composition. If no fulcrum point is detected, flow continues to block 202 where the estimated hook load is obtained or estimated as a function of depth of the drillstring in the wellbore. If a fulcrum point is detected, flow continues to block 222.

At block 222, a slope of the adjusted estimated hook load and a slope of the adjusted measured hook load are determined between the fulcrum point and a previous fulcrum point. For example, with reference to FIG. 1, the drillstring weight calibrator 150 can determine the slope of the adjusted estimated hook load and the slope of the adjusted measured hook load. The slope of the adjusted estimated hook load and the slope of the adjusted measured hook load can be determined graphically or statistically, via line fitting, linear regression, Bayesian fitting, etc. The slope of the adjusted estimated hook load and the slope of the measured hook load can be determined by fitting a function (e.g., line fitting) to values or a portion of the values of the adjusted estimated hook load and the adjusted measured hook load. Based on the fitting, a slope can be determined. The slope of the adjusted estimated hook load and the slope of the adjusted measured hook load can be determined instantaneously based on a first derivative of the adjusted estimated hook load and the adjusted measured hook load, respectively. The slope of the adjusted estimated hook load and the slope of the adjusted measured hook load can be determined piecewise, based on the value of the adjusted estimated hook load and the adjusted measured hook load at each of the fulcrum points. Any appropriate slope calculation method can be used.

At block 224, a calibrated drillstring weight is determined based on the relationship between the estimated drillstring weight, the slop of the adjusted estimated hook load, and the slope of the adjusted measured hook load. For example, with reference to FIG. 1, the drillstring weight calibrator 150 can determine the calibrated drillstring weight 180. The calibrated drillstring weight 180 can be calculated using any appropriate equation as previously described—such as Eq. 30 or 34.

At block 226, the drillstring weight is set to the calibrated drillstring weight. For example, with reference to FIG. 1, the drillstring weight calibrator 150 set the drillstring weight to the calibrated drillstring weight. The drillstring weight calibrator 150, or another controller or programming unit, can thereafter determine the estimated hook load based on the calibrated drillstring weight instead of the previously used drillstring weight. The drillstring weight calibrator 150 can continue to increase the estimated drillstring weight based on any additional components added to the drillstring as a function of depth in the wellbore.

At block 228, it is determined if the substantially vertical portion of the trip in continues. For example, with reference to FIG. 1, the drillstring weight calibrator 150 can determine if the vertical or substantially vertical portion of the trip in continues. The drillstring weight calibrator 150 can determine the verticality of the trip in based on a wellbore plan, based on output from one or more wellbore tools which determine the location and inclination of the BHA or drill bit, based on a change or decreased in measured hook load due to transfer of the normal force to one or more faces of the formation, etc. A change is inclination of the wellbore can also be predicted or expected based on the wellbore plan or path. If the substantially vertical portion of the trip in continues, flow continues to block 230.

At block 230, an adjusted estimated hook load is determined based on the calibrated drillstring weight as a function of depth of the drillstring in the wellbore. For example, with reference to FIG. 1, the drillstring weight calibrator 150 can an adjusted estimated hook load 182. The adjusted estimated hook load 182 can be calculated using any appropriate equation as previously described—such as Eq. 3 or 22.

FIGS. 3A-3C depict example graphs of estimated hook load calibration as a function of depth, obtained during drilling according to some embodiments. FIG. 3A depicts an example graph of hook load as a function of depth. FIG. 3A depicts a graph 300 displaying an example plot of hook load (on x-axis 302), measured at the surface in kips (where 1 kip equals 1000 pounds-force), as a function of depth (on y-axis 304) measured in ft of drilling run. A line 306 represents the measured hook load. A line 308 represents a lower bound for the estimated hook load, while a line 310 represents an upper bound for the estimated hook load. The distance between the line 308 and the line 310 represents the uncertainty in the estimated hook load at a given drilling run depth.

A dashed circle 312 encircles the origin point of the hook load—both measured and estimated. For the graph 300, the measured hook load (and the estimated hook load) is zero at the beginning of the drilling run (i.e., zero depth of the drilling run). In some cases, the drilling run may be measured from a non-zero starting point such as using depth of penetration instead of depth or distance of the drilling run. In some cases, the measured hook load may not be zero at the beginning of a drilling run. In any case, the starting point for the measured hook load can be considered a fulcrum point and used to generate a calibrated estimated hook load.

A dashed oval 314 encircles a second fulcrum point. The second fulcrum point corresponds to inflections or changes in slope for the line 308 representing the lower bound of the estimated hook load, the line 310 representing the upper bound of the estimated hook load and the line 306 representing the measured hook load.

A dashed oval 316 encircles a third fulcrum point. The third fulcrum point corresponds to possible inflections or changes in slope for the line 308 representing the lower bound of the estimated hook load, the line 310 representing the upper bound of the estimated hook load and the line 306 representing the measured hook load. In the graph 300, no hook load is plotted for values of drilling run deeper than the third fulcrum point. As shown in this example, a fulcrum point need not be a well-defined change in slope—fitting parameters can be used to determine slope based on fulcrum points for noisy or incomplete data.

The slope of the line 308 representing the lower bound of the estimated hook load, the line 310 representing the upper bound of the estimated hook load and the line 306 representing the measured hook load is more vertical between the first and second fulcrum points than between the second and third fulcrum point. The change in slope corresponds to a change in drillstring component weight. In the first portion of the wellbore, drillstring components or drillpipe sections have a consistent weight per distance, while in the deeper portion of the wellbore drillstring components or drillpipe sections have a heavier consistent weight per distance. This relationship is described by Equation 35, below:

$$\frac{d(\text{HOOK LOAD})}{d(\text{DEPTH})}\bigg|_{2\,to\,3} > \frac{d(\text{HOOK LOAD})}{d(\text{DEPTH})}\bigg|_{1\,to\,2} \tag{35}$$

where the derivative of hook load with respect to drilling run depth is greater between fulcrum points two and three than between fulcrum points one and two. The method for calibration of estimated hook load described with respect to FIG. 2 can calibrate estimated hook load for drillstrings which become heavier per unit distance or lighter per unit distance and this example should not be considered limiting.

FIG. 3B depicts an example graph of estimated hook load as a function of depth, calibrated according to some embodiments. FIG. 3B depicts a graph 330 displaying an example plot of hook load (on x-axis 332) in kips as a function of depth (on y-axis 334) in ft. A dashed circle 342 encircles the origin point of the hook load—both measured and estimated. A dashed circle 344 encircles a second fulcrum point and a dashed oval 346 encircles a third fulcrum point.

A line 336—between the second and third fulcrum points—together with a line 348—between the first and second fulcrum points—represent the measured hook load. The line 348 also represents an estimated hook load generated based on a calibrated estimated hook load, calibrated according to some embodiments, for the estimated hook load between the first and second fulcrum points. As shown, the calibrated estimated hook load aligns well with the measured hook load. Below the second fulcrum point, a line 338 represents a lower bound for the estimated hook load, while a line 340 represents an upper bound for the estimated hook load. The line 338 and the line 340 are calculated based on the adjusted estimated hook load determined for the second fulcrum point and based on the estimated change in hook load per distance of drilling run.

FIG. 3C depicts an example graph of estimated hook load as a function of depth, calibrated iteratively according to some embodiments. FIG. 3C depicts a graph 360 displaying an example plot of hook load (on x-axis 362) in kips as a function of depth (on y-axis 364) in ft. A dashed circle 372 encircles the origin point of the hook load—both measured and estimated. A dashed circle 374 encircles a second fulcrum point and a dashed circle 376 encircles a third fulcrum point.

A line 366 represent the measured hook load and the estimated hook load. Between the first and second fulcrum points, the estimated hook load is calculated based on a first adjusted estimated hook load. Between the second and third fulcrum points, the estimated hook load is calculated based on a second adjusted estimated hook load. Iterative calibration of the adjusted estimated hook load allow determination of an estimated hook load that aligns well with the measured hook load and removes uncertainty from the estimated hook load calculation and thus the friction factor calculation.

FIGS. 4A and 4B depict a flowchart of example operations for estimated hook load calibration including inner and outer drillstrings, according to some embodiments. A flowchart 400 of FIGS. 4A and 4B includes operations described as performed by the drillstring weight calibrator 150 for consistency with the earlier descriptions. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 400 are described in reference to the example drilling apparatus 100 and the friction factor calculator 178 of FIG. 1. The flowchart includes the operations described as performed by the drillstring weight calibrator 150, but one or more of the operations may instead or additionally be performed by the friction factor calculator 178.

At block 401, a ratio between the inner drillstring weight and the outer drillstring weight is set. For example, the ratio can be determined based on a ratio of the manufacturer supplied weights for the drillstring components. The ratio can be estimated by a program or by a controller or operator with knowledge of the drillstring component weights or relative weights. The ratio can be estimated based on hook loads measured for a previous drillstring or wellbore for a similar drilling run. The ratio can be determined for the entire inner and outer drillstring or for a portion of the drillstrings, such as where the ratio changes as components change. For example, with reference to FIG. 1, the drillstring weight calibrator 150 can set a ratio between the inner drillstring weight and the outer drillstring weight. The ratio can set using any appropriate method, and as an example Equation 36 is provided, below:

$$X = \frac{\text{INNER } \mathit{DRILLSTING} \text{ WEIGHT}}{\text{OUTER DRILLSTRING WEIGHT}} \tag{36}$$

where X is the ratio between the inner and outer drillstring weights.

At block 402, estimated hook load is obtained or calculated as a function of depth of the drillstring in a wellbore. For example, the estimated hook load can be calculated based on the manufacturer supplied weight of the components which make up the drillstring, estimated based on hook load for a previously drilled drillstring in a similar wellbore, calculated based on approximated oppositional forces, etc. For example, with reference to FIG. 1, the drillstring weight calibrator 150 can calculate an estimated hook load 160. The estimated hook load 160 can also be obtained from a separate program or estimator or obtained from a previous run or wellbore with similar characteristics.

At block 404, hook load is obtained or measured as a function of depth of the drillstring in the wellbore. For example, with reference to FIG. 1, the measured hook load 170 can be obtained from the hook load 130 or an appropriate force measurement made at the hook 126 or the traveling block 128 of the example drilling apparatus 100. The measured hook load 170 can also be obtained from a separate program or measurement apparatus.

At block 406, a buckling stability force is calculated for the drillstring at the depth in the wellbore. For example, with reference to FIG. 1, the drillstring weight calibrator 150 can calculate the buckling stability force. The buckling stability force can be calculated using Eq. 14 or any appropriate method. Alternatively, a buoyancy force or another measure of buoyancy can be calculated instead of the buckling stability force.

At block 408, it is determined if drilling fluid is flowing. For example, with reference to FIG. 1, the drillstring weight calibrator 150 can determine if drilling fluid is flowing. Drilling fluid flow can be measured at the surface or another location, for example through with drilling mud return flowmeter. Drilling fluid flow can also be estimated or calculated based on a mud pump parameter, such as a voltage, frequency, or speed (e.g., rotations per minute). Any appropriate determination of drilling mud flow can be used.

At block 410, the pump off force is calculated for the drillstring at the depth in the wellbore. The pump off force can be determined based on a fluid flow rate, annular area, cross sectional area of a drillpipe, etc. using any appropriate method. Any appropriate method of pump off force calculation can be used.

At block 414, the piston force is calculated for the drillstring at the depth in the wellbore. For example, with reference to FIG. 1, the drillstring weight calibrator 150 can determine if the drillstring is tapered and can determine a piston force for the nested drillstrings. A taper piston force can be determined based on knowledge of any shoulders or diameter changes in the drillstring and knowledge of fluids displaced by the drillstring. Additionally, a piston force for the interaction of the inner drillstring and outer drillstring is calculated. Any appropriate method of piston force calculation can be used.

At block 416, the estimated hook load and the measured hook load are adjusted based on the calculated oppositional forces. For example, with reference to FIG. 1, the drillstring weight calibrator 150 can calculate estimated oppositional force 162. The calculated oppositional forces can include the buckling stability force or another measure of buoyancy. The calculated can include a calculated pump off force, a calculated piston force, etc. It should be understood that additional oppositional forces can be calculated or determined in addition to the buckling stability force, the pump off force, and the piston force.

At block 418, an estimated total drillstring weight is determined based on the adjusted estimated hook load. The estimated total drillstring weight can be equal to the adjusted estimated hook load, or can include one or more additional force calculation, calibration, or adjustment. The estimated total drillstring weight is equal to the estimated inner drillstring weight plus the estimated outer drillstring weight. The relationship between the total drillstring weight and the inner and outer drillstring weights can be given by Equation 37, below:

$$\text{TOTAL DRILLSTRING WEIGHT} = \text{INNER DRILLSTRING WEIGHT} + \text{OUTER DRILLSTRING WEIGHT} \tag{37}$$

where Eqs. 36 and 37 can be expanded to include a third nested drillstring weight and so on as needed.

At block 420, it is determined if there is a fulcrum point in measured hook load as a function of depth. For example, with reference to FIG. 1, the drillstring weight calibrator 150 can determine if there is a fulcrum point in measured hook load, according to any of the method previously described. For a nested drillstring, fulcrum points can arise for changes in inner drillstring weight, changes in outer drillstring weight, or changes to both inner and outer drillstring weight. If no fulcrum point is detected, flow continues to block 402 where the estimated hook load is obtained or estimated as a function of depth of the drillstring in the wellbore. If a fulcrum point is detected, flow continues to block 422.

At block 422, a slope of the adjusted estimated hook load and a slope of the adjusted measured hook load are determined between the fulcrum point and a previous fulcrum point. For example, with reference to FIG. 1, the drillstring weight calibrator 150 can determine the slope of the adjusted estimated hook load and the slope of the adjusted measured hook load. The slope of the adjusted estimated hook load and the slope of the adjusted measured hook load can be determined using any appropriate method as previously described. From block 422 of FIG. 4A flow continues to transition point A.

From transition point A flow continues to block 424 of FIG. 4B. At block 424, a calibrated inner drillstring weight and a calibrated outer drillstring weight are determined based on the relationship between the estimated drillstring weight, the slope of the adjusted estimated hook load, the slope of the adjusted measured hook load, and the ratio of the inner drillstring weight and the outer drillstring weight. For example, with reference to FIG. 1, the drillstring weight calibrator 150 can determine the calibrated inner drillstring weight and the calibrated outer drillstring weight. The calibrated inner drillstring weight and the calibrated outer drillstring weight can be calculated using any appropriate equation as previously described—such as Eq. 36 and 37.

At block 426, optionally it is determined if the calibrated inner drillstring weight and calibrated outer drillstring weight are realistic. For example, with reference to FIG. 1, the drillstring weight calibrator 150 if the inner and outer drillstring weights are realistic. Realistic weights can be determined based on an upper and lower bound for estimated inner and outer drillstring weights, or any other appropriate realism criteria. For example, realistic values for an inner string can be determined based on a previous drilling run in which the same or a similar inner string configuration was run without an outer string. If the calibrated inner drillstring weight varies from the calibrated drillstring weight of the previous run by a margin greater than a threshold (for example 5%) then the calibrated inner drillstring weight can be considered unrealistic (i.e., the realism criteria is not satisfied) and an adjustment to the ration between the inner drillstring weight and the outer drillstring weight can be triggered. Realistic drillstring weights can be determined by an operator or controller with knowledge of the drillstring. If the inner and outer drillstring weights are realistic, flow continues to block 430. If the inner and outer drillstring weights are not realistic, flow continues to block 428.

At block 428, the ratio between the inner drillstring weight and the outer drillstring weight is adjusted. The ratio can be adjusted iteratively and/or incrementally in order to determine a realistic inner and outer drillstring weight. For example, with reference to FIG. 1, the drillstring weight calibrator 150 can adjust the ratio between the inner drillstring weight and outer drillstring weight. From block 428, flow continues to block 424 where a calibrated inner drillstring weight and calibrated outer drillstring weight are determined based on the adjusted ratio.

At block 430, the inner drillstring weight is set to the calibrated inner drillstring weight and the outer drillstring weight is set to the calibrated outer drillstring weight. For example, with reference to FIG. 1, the drillstring weight calibrator 150 can set the inner drillstring weight to the calibrated inner drillstring weight and the outer drillstring weight to the calibrated outer drillstring weight. The drillstring weight calibrator 150, or another controller or programming unit, can thereafter determine the estimated hook load based on the calibrated total drillstring weight or the calibrated inner drillstring weight and the calibrated outer drillstring weight instead of the previously used drillstring weight. The drillstring weight calibrator 150 can continue to increase the estimated total drillstring weight based on any additional components added to the drillstring as a function of depth in the wellbore.

At block 432, it is determined if the substantially vertical portion of the trip in continues. For example, with reference to FIG. 1, the drillstring weight calibrator 150 can determine if the vertical or substantially vertical portion of the trip in continues. The drillstring weight calibrator 150 can determine the verticality of the trip based on any appropriate method, as previously described. If the substantially vertical portion of the trip in continues, flow continues to block 434.

At block 434, an adjusted estimated hook load is determined based on the calibrated inner drillstring weight and the calibrated outer drillstring weight as a function of depth of the drillstring in the wellbore. The adjusted estimated hook load can also be determined based on the calibrated total drillstring weight. For example, with reference to FIG. 1, the drillstring weight calibrator 150 can determine an adjusted estimated hook load 182. The adjusted estimated hook load 182 can be calculated using any appropriate equation as previously described—such as Eq. 3 or 22. From block 434, flow continues to transition point B and to block 402 of FIG. 4A, where an estimated hook load is obtained or calculated based on the calibrated inner drillstring weight and the calibrated outer drillstring weight.

FIG. 5 depicts an example graph of estimated hook load as a function of depth for a drillstring comprising an inner string and an outer string, according to some embodiments. FIG. 5 depicts a graph 500 displaying an example plot of hook load (on x-axis 502) in kips as a function of depth (on y-axis 504) in ft for an inner and outer drillstring. A dashed circle 514 encircles the origin point of the hook load— both measured and estimated. A dashed oval 516 encircles a second fulcrum point, a dashed oval 518 encircles a third fulcrum point, and a dashed oval 520 encircles a fourth fulcrum point.

A line 506 represents the measured hook load. A line 508 represents a lower bound for the estimated hook load, while a line 510 represents an upper bound for the estimated hook load. The distance between the line 508 and the line 510 represents the uncertainty in the estimated hook load at a given drilling run depth. A line 512 represents the estimated hook load calculated just for the outer drillstring.

The second fulcrum point represents a change in the inner drillstring weight as a function of depth. The second fulcrum point is present as an inflection in the measured hook load and the upper and lower bounds for the estimated hook load. The second fulcrum point is not present in the estimated hook load for the outer drillstring alone, because the outer drillstring weight does not change at the second fulcrum point.

The third fulcrum point represents a change in the outer drillstring weight as a function of depth. The third fulcrum point is present as an inflection in the measured hook load and the upper and lower bounds for the estimated hook load and in the estimated hook load for the outer drillstring alone. The method described in detail in FIGS. 4A-4B can account for changes in drillstring weight in both the inner and outer drillstring through the use of a variable ratio between the inner and outer drillstring weights. Calibration of the total drillstring weight, inner drillstring weight, and outer drillstring weight can generate an estimated hook load in line with the measured hook load for substantially vertical portions of the wellbore and thus improve the calculation of friction factor.

Centralizers and Standoff Devices

A drillstring with centralizers or other standoff devices can experience both running drag and friction as a result of the centralizers. The centralizer running drag for each centralizer can be approximated from manufacturer specification. The total running drag can be approximated or estimated based on the number of centralizers within the wellbore and the running drag per centralizer. Centralizer running drag operates as an oppositional force against the direction of travel of the drillstring.

Centralizers or other standoff devices also generate a friction force, which is governed by the general friction force of Eq. 1 given above and reproduced below:

$$F_f = \mu F_N = FF * F_N \tag{1}$$

where $F_f$ is the friction force and $F_N$ is the normal force. However, for centralizers the normal force is not the downward force but rather the axial force against the casing or wellbore walls. The centralizer friction factor can then be given by Equation 38, below:

$$F_f = \mu F_A = FF_C * F_A \tag{38}$$

where $F_A$ is the axial normal force and $FF_C$ is the centralizer friction factor. If the axial force is known, the friction force for the centralizers can be calculated. If the axial force is not known, or is unsteady, then the friction force of the centralizers can affect calculation of the calibrated drillstring weight.

For a drillstring suspended in a wellbore, the hook load is then given by Equations 39 and 40, below:

$$\text{MEASURED DRILLSTRING WEIGHT} = \tag{39}$$

$$F_g - F_f - F_{fC} - F_{RD} - \Delta F =$$

-continued $$F_g - FF*F_N - FF_C*F_A - F_{RD} - \Delta F = F_N = \text{HOOK LOAD}$$

where $F_{RD}$ is the oppositional force due to running drag, $\Delta F_C$ is the combined running drag and centralizer friction force or the centralizer oppositional force, and $\Delta F$ represents other oppositional forces, such as piston force, pump off force, etc.

This gives a value for the friction factor as shown in Equations 40 and 41, below:

$$FF = \frac{\text{ESTIMATED DRILLSTRING WEIGHT} - \Delta F_C - \Delta F - \text{HOOK LOAD}}{\text{HOOK LOAD}} \quad (40)$$

$$\text{ESTIMATED DRILLSTRING WEIGHT} = F_g - \Delta F_C - \Delta F \quad (41)$$

The calibrated drillstring weight can then be calculated using both the estimated running drag and friction force.

FIGS. 6A and 6B depict a flowchart of example operations for estimated hook load calibration including centralizer effects, according to some embodiments. A flowchart 600 of FIGS. 6A and 6B includes operations described as performed by the drillstring weight calibrator 150 for consistency with the earlier descriptions. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 600 are described in reference to the example drilling apparatus 100 and the friction factor calculator 178 of FIG. 1. The flowchart includes the operations described as performed by the drillstring weight calibrator 150, but one or more of the operations may instead or additionally be performed by the friction factor calculator 178.

At block 602, estimated hook load is obtained or calculated as a function of depth of the drillstring in a wellbore. For example, with reference to FIG. 1, the drillstring weight calibrator 150 can calculate an estimated hook load 160 using any appropriate method as previously described.

At block 604, hook load is obtained or measured as a function of depth of the drillstring in the wellbore. For example, with reference to FIG. 1, the measured hook load 170 can be obtained from the hook load 130 using any appropriate method as previously described.

At block 605, an estimated drag is obtained or estimated based on the number of centralizers and drag per centralizer as a function of depth in the wellbore. For example, with reference to FIG. 1, the drillstring weight calibrator 150 can estimate drag based on the manufacturer's specifications. The estimated drag can also be calculated based on drag measured in previous and/or similar wellbores or drilling runs. The estimated drag can be calculated using any appropriate method.

At block 606, a centralizer friction force is obtained or estimated as a function of depth in the wellbore. For example, with reference to FIG. 1, the drillstring weight calibrator 150 can estimate the friction force due to centralizer drag based on manufacturers specifications. The estimated centralizer friction force can also be calculated based on drag measured in previous and/or similar wellbores or drilling runs. The estimated centralizer friction force can be calculated using any appropriate method.

At block 607, a buckling stability force is calculated for the drillstring at the depth in the wellbore. For example, with reference to FIG. 1, the drillstring weight calibrator 150 can calculate the buckling stability force. The buckling stability force can be calculated using any appropriate method.

At block 608, it is determined if drilling fluid is flowing. For example, with reference to FIG. 1, the drillstring weight calibrator 150 can determine if drilling fluid is flowing. Any appropriate determination of drilling mud flow can be used, as previously described.

At block 610, the pump off force is calculated for the drillstring at the depth in the wellbore. The pump off force can be determined based on a fluid flow rate, annular area, cross sectional area of a drillpipe, etc. using any appropriate method. Any appropriate method of pump off force calculation can be used.

At block 612, it is determined in the drillstring is tapered. For example, with reference to FIG. 1, the drillstring weight calibrator 150 can determine if the drillstring is tapered. Drillstring shoulders or profiles which can generate piston force can be determined from a drilling plan, by an operator at the kelly or rotary table, based on manufacturer specifications, etc.

At block 614, the piston force is calculated for the drillstring at the depth in the wellbore. The piston force can be determined based on knowledge of any shoulders or diameter changes in the drillstring and knowledge of fluids displaced by the drillstring. Any appropriate method of piston force calculation can be used.

At block 616, the estimated hook load and the measured hook load are adjusted based on the calculated oppositional forces. For example, with reference to FIG. 1, the drillstring weight calibrator 150 can calculate estimated oppositional force 162. The calculated oppositional forces can include the buckling stability force or another measure of buoyancy. The calculated can include a calculated pump off force, a calculated piston force, etc. The calculated oppositional forces can include the estimated drag and the estimated centralizer friction force. It should be understood that additional oppositional forces can be calculated or determined in addition to the buckling stability force, the pump off force, the piston force, drag, and the centralizer friction force.

At block 618, an estimated drillstring weight is determined based on the adjusted estimated hook load. The estimated drillstring weight can be equal to the adjusted estimated hook load, or can include one or more additional force calculation, calibration, or adjustment.

At block 620, it is determined if there is a fulcrum point in measured hook load as a function of depth. For example, with reference to FIG. 1, the drillstring weight calibrator 150 can determine if there is a fulcrum point in measured hook load. A fulcrum point can be detected with any appropriate method. If no fulcrum point is detected, flow continues to block 602 where the estimated hook load is obtained or estimated as a function of depth of the drillstring in the wellbore. If a fulcrum point is detected, flow continues to transition point A and to block 622 of FIG. 6B.

At block 622, a slope of the adjusted estimated hook load and a slope of the adjusted measured hook load are determined between the fulcrum point and a previous fulcrum point. For example, with reference to FIG. 1, the drillstring weight calibrator 150 can determine the slope of the adjusted estimated hook load and the slope of the adjusted measured hook load. The slope of the adjusted estimated hook load and the slope of the adjusted measured hook load can be determined using any appropriate slope calculation method, as previously described.

At block 624, a calibrated drillstring weight is determined based on the relationship between the estimated drillstring weight, the slop of the adjusted estimated hook load, and the slope of the adjusted measured hook load. For example, with reference to FIG. 1, the drillstring weight calibrator 150 can determine the calibrated drillstring weight 180. The calibrated drillstring weight 180 can be calculated using any appropriate equation as previously described—such as Eq. 30 or 34.

At block 626, the drillstring weight is set to the calibrated drillstring weight. For example, with reference to FIG. 1, the drillstring weight calibrator 150 set the drillstring weight to the calibrated drillstring weight. The drillstring weight can be set or determined using any appropriate method, as previously described.

At block 628, it is determined if the substantially vertical portion of the trip in continues. For example, with reference to FIG. 1, the drillstring weight calibrator 150 can determine if the vertical or substantially vertical portion of the trip in continues. If the substantially vertical portion of the trip in continues, flow continues to block 630.

At block 630, an adjusted estimated hook load is determined based on the calibrated drillstring weight as a function of depth of the drillstring in the wellbore. For example, with reference to FIG. 1, the drillstring weight calibrator 150 can an adjusted estimated hook load 182. The adjusted estimated hook load 182 can be calculated using any appropriate equation as previously described—such as Eq. 3 or 22—or any other appropriate method. Flow continues to transition point B and then to block 604 of FIG. 6A.

FIG. 7 depicts a flowchart of example operations for calculation and calibration of a centralizer running drag and friction factor, according to some embodiments. A flowchart 700 of FIG. 7 includes operations described as performed by the drillstring weight calibrator 150 for consistency with the earlier descriptions. Such operations can be performed by a controller or processor, hardware, firmware, software, or a combination thereof of one or more computers, including asynchronously. However, apparatus component naming, division, organization, and program code naming, organization, and deployment can vary due to arbitrary operating choice, ordering, programmer choice, programming language(s), platform, etc. Additional, operations of the flowchart 700 are described in reference to the example drilling apparatus 100 and the friction factor calculator 178 of FIG. 1. The flowchart includes the operations described as performed by the drillstring weight calibrator 150, but one or more of the operations may instead or additionally be performed by the friction factor calculator 178.

At block 702, a drag per centralizer and a centralizer friction force are set. For example, the drag per centralizer can be determined based on manufacturer specifications. The drag per centralizer can be estimated by a program or by a controller or operator with knowledge of the centralizer behavior. The drag per centralizer can be estimated based on drag per centralizer measured for a previous drillstring or wellbore for a similar drilling run. The centralizer friction force can be determined based manufacturer specifications. The centralizer friction factor can be estimated by a program or by a controller or operator with knowledge of the centralizer friction factor. The centralizer friction force can be determined based on a centralizer friction factor and knowledge of the axial force exerted between the centralizer and the casing or wellbore. The centralizer friction force can be estimated based on the centralizer friction force measured for a previous drillstring or wellbore for a similar drilling run. For example, with reference to FIG. 1, the drillstring weight calibrator 150 can set a drag per centralizer and a centralizer friction force. The drag per centralizer and the centralizer friction force can set using any appropriate method.

At block 704, estimated hook load is obtained or calculated as a function of depth of the drillstring in a wellbore based on the drag per centralizer, the number of centralizers, and the centralizer friction force. For example, with reference to FIG. 1, the drillstring weight calibrator 150 can calculate an estimated hook load 160 using any appropriate method as previously described such as those described in reference to FIGS. 6A and 6B.

At block 706, hook load is obtained or measured as a function of depth of the drillstring in the wellbore. For example, with reference to FIG. 1, the measured hook load 170 can be obtained from the hook load 130 using any appropriate method as previously described.

At block 708, it is determined if the substantially vertical portion of the trip in continues. For example, with reference to FIG. 1, the drillstring weight calibrator 150 can determine if the vertical or substantially vertical portion of the trip in continues. If the substantially vertical portion of the trip in continues, flow continues to block 710.

At block 710, a centralizer friction factor is determined for the vertical wellbore based on the estimated hook load and the measured hook load. For example, with reference to FIG. 1, the drillstring weight calibrator 150 or the friction factor calculator 178 can calculate the centralizer friction factor. The centralizer friction factor can be determined using Eq. 13 (given above and reproduced below), as applied to the estimated hook load of block 704 and the measured hook load of block 706, or any other appropriate method.

$$FF = \frac{\text{ESTIMATED HOOK LOAD} - \text{HOOK LOAD}}{\text{HOOK LOAD}} \tag{13}$$

At block 712, it is determined if the centralizer friction factor increases for additional centralizers. For example, with reference to FIG. 1, the drillstring weight calibrator 150 or the friction factor calculator 178 can determine if the centralizer friction factor increases as centralizers are added to the wellbore. If the friction factor increases for additional centralizers, flow continues to block 714. If the friction factor does not increase for additional centralizers, flow continues to block 704, where the estimated hook load is calculated or obtained.

At block 714, the drag per centralizer is increased. For example, with reference to FIG. 1, the drillstring weight calibrator 150 can increase the drag per centralizer used in its calculations. The drag per centralizer can be increased by an increment amount, such as 10%, or can be increased by an amount commensurate to the amount of increase in the friction force for each additional centralizer. The increase in the friction force for each centralizer can be determined based on the calculated centralizer friction factor and the estimated drillstring weight. From block 714, flow continues to block 704, where the estimated hook load is calculated or obtained using the increased drag per centralizer.

FIGS. 8A and 8B depict example graphs of hook load as a function of depth for a drillstring with centralizers, according to some embodiments. FIG. 8A depicts a graph 800 displaying an example plot of hook load (on x-axis 802) in kips as a function of depth (on y-axis 804) in ft for an inner and outer drillstring. A dashed circle 816 encircles the origin point of the hook load—both measured and estimated. A dashed oval 818 encircles a second fulcrum point, a dashed oval 820 encircles a third fulcrum point, and a dashed oval 822 encircles a fourth fulcrum point.

A line 806 together with a line 808 represents the measured hook load. A line 810 together with the line 808 represent a lower bound for the estimated hook load calculated without accounting for centralizers, while a line 812 represents an upper bound for the estimated hook load calculated without accounting for centralizers. A line 814 represents the measured hook load adjusted to account for centralizer drag.

The second fulcrum point represents a change in drag due to the addition of centralizers. The centralizers can produce enough drag to cause the measured hook load to increase. Centralizer drag effects, if incorrectly calculated, can reduce the measured hook load so much that the drillstring does not advance into the wellbore—i.e., can create a zero or negative hook load. The third and fourth fulcrum points represent a change in the outer drillstring weight as a function of depth.

FIG. 8B depicts a graph 850 displaying an example plot of hook load (on x-axis 852) in kips as a function of depth (on y-axis 854) in ft for an inner and outer drillstring. A dashed circle 856 encircles the origin point of the hook load—both measured and estimated. A dashed circle 858 encircles a second fulcrum point, a dashed oval 860 encircles a third fulcrum point, and a dashed oval 862 encircles a fourth fulcrum point.

A line 870 together with a line 872 represents the measured hook load. A line 874 together with the line 870 represent an estimated hook load calculated for high drag centralizers. A line 876 together with the line 870 represent an estimated hook load calculated for low drag centralizers. A line 878 together with the line 870 represent an estimated hook load for the drillstring calculated without accounting for centralizers. In FIG. 8B, the estimated drillstring weight and estimated hook load are calibrated according to various embodiments. This creates the agreement between the estimated hook load and the measured hook load represented by the line 870.

At each of the pivot points of FIG. 8B, the estimated drillstring weight is calibrated. The second fulcrum point represents a change in drag due to the addition of centralizers. The third and fourth fulcrum points represent a change in the outer drillstring weight as a function of depth.

Example Drilling System

Figure 9:
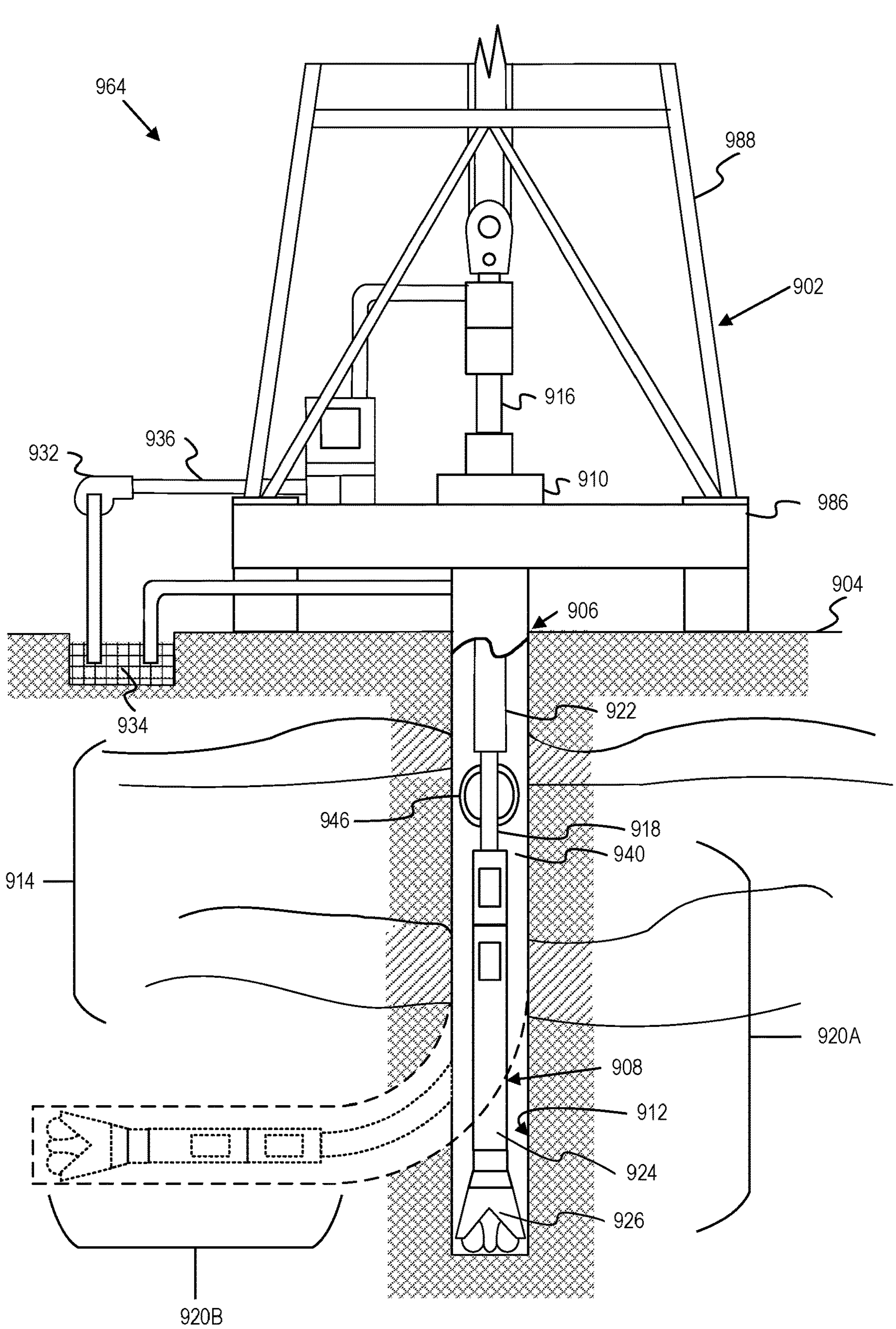
FIG. 9 depicts a schematic diagram of an example drilling rig system, according to some embodiments.

FIG. 9 depicts a schematic diagram of an example drilling rig system, according to some embodiments. For example, in FIG. 9 it can be seen how a system 964 may also form a portion of a drilling rig 902 located at the surface 904 of a well 906. Drilling of oil and gas wells is commonly carried out using a string of drill pipes connected together so as to form a drillstring 908 that is lowered through a rotary table 910 into a wellbore or borehole 912. Here a drilling platform 986 is equipped with a derrick 988 that supports a hoist.

The drilling rig 902 may thus provide support for the drillstring 908. The drillstring 908 may operate to penetrate the rotary table 910 for drilling the borehole 912 through subsurface formations 914. The drillstring 908 may include a Kelly 916, drill pipe 918, and a bottom hole assembly 920A or 920B, perhaps located at the lower portion of the drill pipe 918. Both a vertical and lateral portion of the borehole 912 are depicted. It should be understood that drilling can take place at an inclination, including in a lateral borehole that trends upwards. The drillstring 908 may also include one or more centralizers 946 or other standoff devices. The one or more centralizer 946 may make intermittent or consistent contact with the borehole 912 as the drillstring 908 is advanced through the subsurface formations 914.

The bottom hole assembly 920 may include drill collars 922, a down hole tool 924, and a drill bit 926. The drill bit 926 may operate to create a borehole 912 by penetrating the surface 904 and subsurface formations 914. The down hole tool 924 may comprise any of a number of different types of tools including MWD tools, LWD tools, and others.

During drilling operations, the drillstring 908 (perhaps including the Kelly 916, the drill pipe 918, and the bottom hole assembly 920) may be rotated by the rotary table 910. In addition to, or alternatively, the bottom hole assembly 920 may also be rotated by a motor (e.g., a mud motor) that is located down hole. Additionally, the mud motor may be used as a communication device, such as via frequency or amplitude modulation, between the drill bit 926 and surface controller located at the surface 904. The drill collars 922 may be used to add weight to the drill bit 926. The drill collars 922 may also operate to stiffen the bottom hole assembly 920, allowing the bottom hole assembly 920 to transfer the added weight to the drill bit 926, and in turn, to assist the drill bit 926 in penetrating the surface 904 and subsurface formations 914.

During drilling operations, a mud pump 932 may pump drilling fluid (sometimes known by those of ordinary skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation 914 cuttings created by operating the drill bit 926. It is the images of these cuttings that many embodiments operate to acquire and process.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 202 and 204 can be performed in parallel or concurrently. With respect to FIG. 4, a determination that the calibrated inner drillstring weight and the calibrated outer drillstring weight are realistic is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Example Computer

Figure 10:
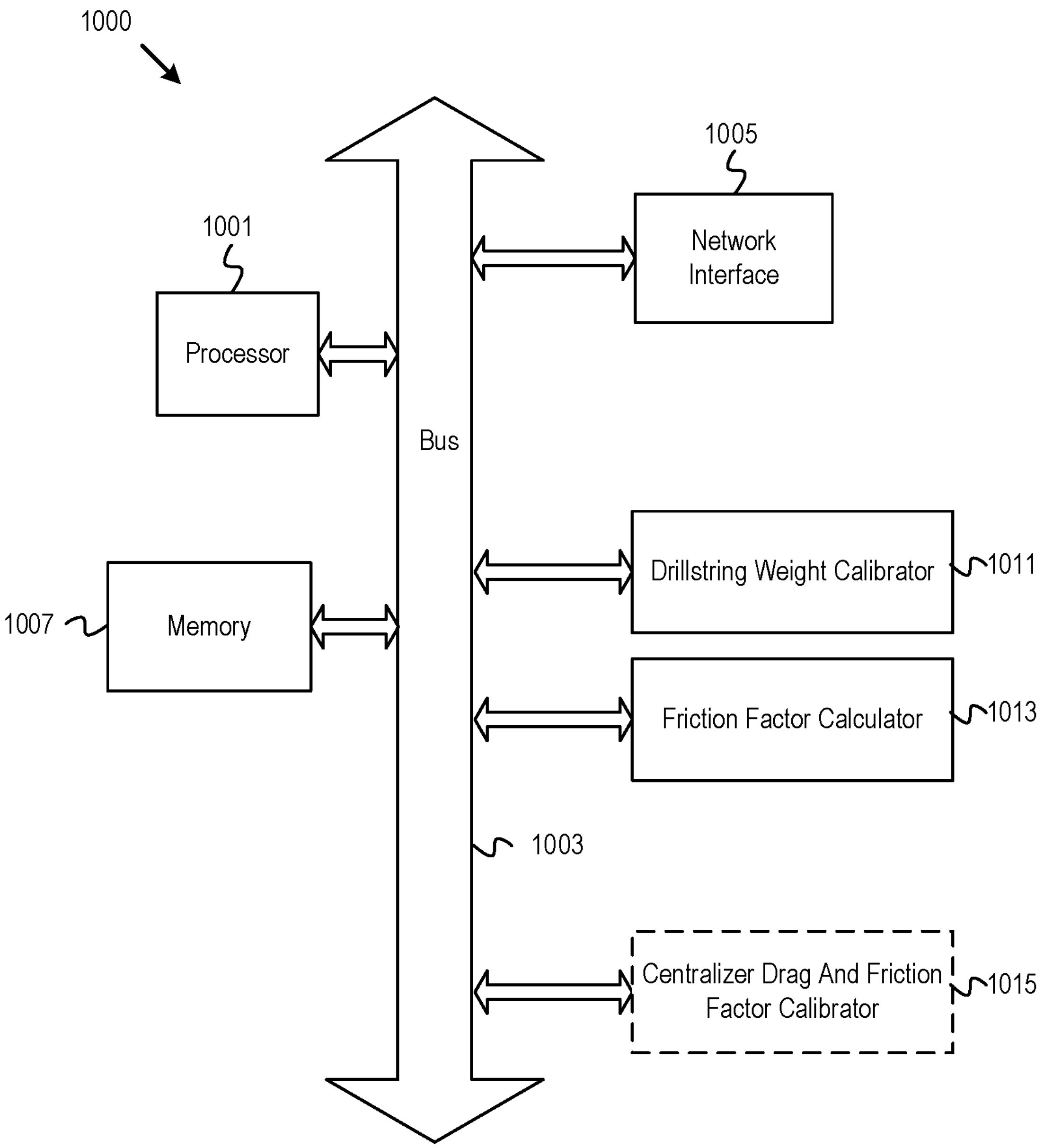
FIG. 10 depicts an example computer, according to some embodiments.

FIG. 10 depicts an example computer, according to some embodiments. FIG. 10 depicts a computer 1000 that includes a processor 1001 (possibly including multiple processors, multiple cores, multiple nodes, and/or implementing multi-threading, etc.). The computer 1000 includes memory 1007. The memory 1007 may be system memory or any one or more of the above already described possible realizations of machine-readable media. The computer 1000 also includes a bus 1003 and a network interface 1005.

The computer 1000 can communicate via transmissions to and/or from remote devices via the network interface 1005 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 1000 also includes a drillstring weight calibrator 1011, a friction factor calculator 1013, and optionally, a centralizer drag and friction factor calibrator 1015. The drillstring weight calibrator 1011 can calibrate an adjusted drillstring weight and estimated hook load based on the measured hook load for vertical portions of the wellbore. The friction factor calculator 1013 can determine a friction factor based on the estimated hook load and the measured hook load for non-vertical portions of the wellbore. Additionally, the friction factor calculator 1013 can determine a friction factor for drillstrings with centralizers or other drag elements in vertical portions of the wellbore. The centralizer drag and friction factor calibrator 1015 can determine a centralizer friction factor and calibrates centralizer drag based on an analysis of the centralizer friction factor. Any one of the previously described functionalities may be partially (or entirely) implemented in hardware and/or on the processor 1001. For example, the functionality may be implemented with an application specific integrated circuit, in logic implemented in the processor 1001, in a co-processor on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

While the aspects of the disclosure are described with reference to various implementations and exploitations, it will be understood that these aspects are illustrative and that the scope of the claims is not limited to them. In general, techniques for estimated drillstring weight calibration and estimated hook load calibration as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Example Embodiments

Embodiment 1: A method comprising: determining a value of at least one oppositional force for a drillstring at multiple depths in a wellbore; determining a value of a drag force for the drillstring at the multiple depths in the wellbore; determining a value of hook load for the drillstring at the multiple depths in the wellbore based on the value of the at least one oppositional force and the value of the drag force at the multiple depths; and determining a calibrated drillstring weight based on a change of the value of hook load for the drillstring over the multiple depths in the wellbore.

Embodiment 2: The method of embodiment 1, wherein determining the value of hook load for the drillstring comprises determining a value of a measured hook load for the drillstring at the multiple depths based on the value of the at least one oppositional force and the value of the drag force, and determining a value of an estimated hook load for the drillstring at the multiple depths based on the value of the at least one oppositional force and the value of the drag force, and wherein determining the calibrated drillstring weight comprises determining the calibrated drillstring weight based on a change in the measured hook load and a change in the estimated hook load.

Embodiment 3: The method of embodiment 2, wherein determining the value of the estimated hook load further comprises determining an adjusted drillstring weight at the multiple depths in the wellbore based on the value of the at least one oppositional force, the value of the drag force, and the value of the estimated hook load, and wherein determining the calibrated drillstring weight comprises determining the calibrated drillstring weight based on a change in the measured hook load and a change in the adjusted drillstring weight.

Embodiment 4: The method of any one of embodiments 1 to 3, further comprising: determining a value of an adjusted estimated hook load for the drillstring at the multiple depths in the wellbore based on the calibrated drillstring weight, wherein determining the value of the adjusted estimated hook load comprises determining the value of the adjusted estimated hook load based on the calibrated drillstring weight, the value of the drag force, and the value of the at least one oppositional force at the multiple depths in the wellbore.

Embodiment 5: The method of any one of embodiments 1 to 4, wherein determining the calibrated drillstring weight based on a change in the value of hook load for the drillstring over the multiple depths in the wellbore comprises determining a rate of change of the value of hook load over at least two of the multiple depths in the wellbore.

Embodiment 6: The method of embodiment 5, wherein the at least two of the multiple depths in the wellbore comprise a first depth in the wellbore before addition of a first centralizer to the wellbore and a second depth in the wellbore after addition of the first centralizer to the wellbore.

Embodiment 7: The method of any one of embodiments 1 to 6, wherein determining a value of the drag force for the drillstring at the multiple depths in the wellbore comprises: for each depth of the multiple depths, determining a value of a centralizer drag force based on a number of centralizers in the wellbore at the each depth and a drag per centralizer values.

Embodiment 8: The method of any one of embodiments 1 to 7, wherein determining a value of the drag force for the drillstring comprises determining a value of the drag force based on a centralizer friction factor.

Embodiment 9: The method of any one of embodiments 1 to 8, further comprising: determining a first friction factor for the drillstring for a first depth in the wellbore based on a first calibrated drillstring weight, a value of hook load, the value of the at least one oppositional force, and the value of the drag force, wherein determining the first calibrated drillstring weight comprises determining the calibrated drillstring weight for the first depth in the wellbore.

Embodiment 10: The method of embodiment 9, further comprising: determining a second friction factor for the drillstring for a second depth in the wellbore based on a second calibrated drillstring weight, a value of hook load, the value of the at least one oppositional force, and the value of the drag force, wherein determining the second calibrated drillstring weight comprises determining the calibrated drillstring weight for the second depth in the wellbore.

Embodiment 11: The method of embodiment 10, wherein the wellbore is substantially vertical at the first depth and the second depth.

Embodiment 12: The method of embodiment 10 or 11, further comprising: determining whether a friction factor increases as a function of a number of centralizers in the wellbore based a number of centralizers in the wellbore at the first depth and a number of centralizers in the wellbore at the second depth and on the first friction factor and the second friction factor; and based on a determination that the friction factor increases as a function of the number of centralizers in the wellbore, increasing a value of drag per centralizer, wherein determining a value of the drag force for the drillstring comprises determining a value of the drag force based on the number of centralizers in the wellbore and the drag per centralizer value.

Embodiment 13: The method of any one of embodiments 10 to 12, further comprising: determining whether a friction factor decreases as a function of a number of centralizers in the wellbore based a number of centralizers in the wellbore at the first depth and a number of centralizers in the wellbore at the second depth and on the first friction factor and the second friction factor; and based on a determination that the friction factor decreases as a function of the number of centralizers in the wellbore, decreasing a value of drag per centralizer, wherein determining a value of the drag force for the drillstring comprises determining a value of the drag force based on the number of centralizers in the wellbore and the drag per centralizer value.

Embodiment 14: One or more non-transitory machine-readable media comprising program code for drillstring weight calibration, the program code to: determine a value of at least one oppositional force for a drillstring at multiple depths in a wellbore; determine a value of a drag force for the drillstring at the multiple depths in the wellbore; determine a value of hook load for the drillstring at the multiple depths in the wellbore based on the value of the at least one oppositional force and the value of the drag force at the multiple depths; and determine a calibrated drillstring weight based on a change of the value of hook load for the drillstring over the multiple depths in the wellbore.

Embodiment 15: The machine-readable media of embodiment 14, wherein program code to determine the calibrated drillstring weight comprises program code to: determine a rate of change of the value of hook load over at least two of the multiple depths in the wellbore.

Embodiment 16: The machine-readable media of embodiment 15, the at least two of the multiple depths in the wellbore comprise a first depth in the wellbore before addition of a first centralizer to the wellbore and a second depth in the wellbore after addition of the first centralizer to the wellbore.

Embodiment 17: The machine-readable media of any one of embodiments 14 to 16, further comprising program code to: determine a first friction factor for the drillstring for a first depth in the wellbore based on a first calibrated drillstring weight, a value of hook load, the value of the at least one oppositional force, and the value of the drag force, wherein determining a first calibrated drillstring weight comprises determining the calibrated drillstring weight for the first depth in the wellbore; determine a second friction factor for the drillstring for a second depth in the wellbore based on a second calibrated drillstring weight, a value of hook load, the value of the at least one oppositional force, and the value of the drag force, wherein determining the second calibrated drillstring weight comprises determining the calibrated drillstring weight for the second depth in the wellbore; and determine whether a friction factor increases as a function of a number of centralizers in the wellbore based a number of centralizers in the wellbore at the first depth and a number of centralizers in the wellbore at the second depth and on the first friction factor and the second friction factor.

Embodiment 18: The machine-readable media of embodiment 17, further comprising program code to: based on a determination that the friction factor increases as a function of the number of centralizers in the wellbore, increase a value of drag per centralizer, wherein determining a value of the drag force for the drillstring comprises determining a value of the drag force based on the number of centralizers in the wellbore and the drag per centralizer value.

Embodiment 19: An apparatus comprising: a processor; and a machine-readable medium having program code executable by the processor to cause the apparatus to, determine a first value of at least one oppositional force for a drillstring at a first depth in a wellbore; determine a first value of drag force for the drillstring at the first depth in the wellbore; determine a first value of hook load for the drillstring at the first depth in the wellbore based on the first value of the at least one oppositional force at the first depth and the first value of the drag force; determine a second value of at least one oppositional force for a drillstring at a second depth in a wellbore; determine a second value of drag force for the drillstring at the second depth in the wellbore; determine a second value of hook load for the drillstring at the second depth in the wellbore based on the second value of the at least one oppositional force at the second depth and the second value of the drag force; and determine a first calibrated drillstring weight based on a difference between the first value of hook load and the second value of hook load.

Embodiment 20: The apparatus of embodiment 19, wherein the program code further comprises program code executable by the processor to cause the apparatus to: determine a third value of at least one oppositional force for a drillstring at a third depth in a wellbore; determine a third value of drag force for the drillstring at the third depth in the wellbore; determine a third value of hook load for the drillstring at the third depth in the wellbore based on the third value of the at least one oppositional force at the third depth and the third value of the drag force; and determine a second calibrated drillstring weight based the first calibrated drillstring weight and on a difference between the second value of hook load and the third value of hook load.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:

determining a value of at least one oppositional force for a drillstring at multiple depths in a wellbore, wherein the at least one oppositional force includes a centralizer friction force based on the presence of one or more centralizers positioned within the wellbore;

determining a value of hook load for the drillstring at the multiple depths in the wellbore based at least in part on the value of the at least one oppositional force;

determining a calibrated drillstring weight based on a change of the value of hook load for the drillstring over the multiple depths in the wellbore;

determining a friction factor based on the calibrated drillstring weight; and controlling one or more drilling operations performed on the wellbore based at least in part on the friction factor.

2. The method of claim 1, wherein determining the value of hook load for the drillstring comprises determining a value of a measured hook load for the drillstring at the multiple depths based on the value of the at least one oppositional force, and determining a value of an estimated hook load for the drillstring at the multiple depths based on the value of the at least one oppositional force, and wherein determining the calibrated drillstring weight comprises determining the calibrated drillstring weight based on a change in the measured hook load and a change in the estimated hook load.

3. The method of claim 2, wherein determining the value of the estimated hook load further comprises determining an adjusted drillstring weight at the multiple depths in the wellbore based on the value of the at least one oppositional force, and the value of the estimated hook load, and wherein determining the calibrated drillstring weight comprises determining the calibrated drillstring weight based on the change in the measured hook load and a change in the adjusted drillstring weight.

4. The method of claim 1, further comprising:

determining a value of an adjusted estimated hook load for the drillstring at the multiple depths in the wellbore based on the calibrated drillstring weight, wherein determining the value of the adjusted estimated hook load comprises determining the value of the adjusted estimated hook load based on the calibrated drillstring weight, and the value of the at least one oppositional force at the multiple depths in the wellbore.

5. The method of claim 1, wherein determining the calibrated drillstring weight based on a change in the value of hook load for the drillstring over the multiple depths in the wellbore comprises determining a rate of change of the value of hook load over at least two of the multiple depths in the wellbore.

6. The method of claim 5, wherein the at least two of the multiple depths in the wellbore comprise a first depth in the wellbore before addition of a first centralizer of the one or more centralizers to the wellbore and a second depth in the wellbore after addition of the first centralizer to the wellbore.

7. The method of claim 1, wherein the at least one oppositional force includes a centralizer running drag based on a number of the one or more centralizers positioned within the wellbore and a set of drag per centralizer values.

8. The method of claim 7, wherein the set of drag per centralizer values is approximated from one or more manufacturer specifications.

9. The method of claim 1, wherein determining the friction factor further comprises:

determining a first friction factor for the drillstring for a first depth in the wellbore based on a first calibrated drillstring weight, and the value of hook load, the value of the at least one oppositional force, wherein determining the first calibrated drillstring weight comprises determining the calibrated drillstring weight for the first depth in the wellbore.

10. The method of claim 9, further comprising:

determining a second friction factor for the drillstring for a second depth in the wellbore based on a second calibrated drillstring weight, the value of hook load, and the value of the at least one oppositional force, wherein determining the second calibrated drillstring weight comprises determining the calibrated drillstring weight for the second depth in the wellbore.

11. The method of claim 10, wherein the wellbore is substantially vertical at the first depth and the second depth.

12. The method of claim 10, further comprising:

determining whether the friction factor increases as a function of a number of the one or more centralizers positioned in the wellbore at the first depth and a number of the one or more centralizers positioned in the wellbore at the second depth and on the first friction factor and the second friction factor; and based on a determination that the friction factor increases as a function of the number of centralizers in the wellbore, increasing a value of drag per centralizer.

13. The method of claim 10, further comprising:

determining whether the friction factor decreases as a function of a number of the one or more centralizers positioned in the wellbore based on a number of centralizers in the wellbore at the first depth and a number of centralizers in the wellbore at the second depth and on the first friction factor and the second friction factor; and based on a determination that the friction factor decreases as a function of the number of centralizers in the wellbore, decreasing a value of drag per centralizer.

14. One or more non-transitory machine-readable media comprising program code for drillstring weight calibration, the program code to:

determine a value of at least one oppositional force for a drillstring at multiple depths in a wellbore, wherein the at least one oppositional force includes a centralizer friction force based on the presence of one or more centralizers positioned within the wellbore;

determine a value of hook load for the drillstring at the multiple depths in the wellbore based at least in part on the value of the at least one oppositional force;

determine a calibrated drillstring weight based on a change of the value of hook load for the drillstring over the multiple depths in the wellbore;

determine a friction factor based on the calibrated drillstring weight; and control one or more drilling operations performed on the wellbore based at least in part on the friction factor.

15. The one or more non-transitory machine-readable media of claim 14, wherein program code to determine the calibrated drillstring weight comprises program code to:

determine a rate of change of the value of hook load over at least two of the multiple depths in the wellbore.

16. The one or more non-transitory machine-readable media of claim 15, the at least two of the multiple depths in the wellbore comprise a first depth in the wellbore before addition of a first centralizer to the wellbore and a second depth in the wellbore after addition of the first centralizer to the wellbore.

17. The one or more non-transitory machine-readable media of claim 14, further comprising program code to:

determine a first friction factor for the drillstring for a first depth in the wellbore based on a first calibrated drillstring weight, the value of hook load, and the value of the at least one oppositional force, wherein determining the first calibrated drillstring weight comprises determining the calibrated drillstring weight for the first depth in the wellbore;

determine a second friction factor for the drillstring for a second depth in the wellbore based on a second calibrated drillstring weight, the value of hook load, the value of the at least one oppositional force, wherein determining the second calibrated drillstring weight comprises determining the calibrated drillstring weight for the second depth in the wellbore; and determine whether the friction factor increases as a function of a number of centralizers in the wellbore based on a number of centralizers in the wellbore at the first depth and a number of centralizers in the wellbore at the second depth and on the first friction factor and the second friction factor.

18. The one or more non-transitory machine-readable media of claim 17, further comprising program code to:

based on a determination that the friction factor increases as a function of the number of centralizers in the wellbore, increase a value of drag per centralizer.

19. An apparatus comprising:

a processor; and a non-transitory machine-readable medium having program code executable by the processor to cause the apparatus to, determine a first value of at least one oppositional force for a drillstring at a first depth in a wellbore, wherein the at least one oppositional force includes a centralizer friction force based on the presence of one or more centralizers positioned within the wellbore at the first depth;

determine a first value of hook load for the drillstring at the first depth in the wellbore based on the first value of the at least one oppositional force at the first depth determine a second value of the at least one oppositional force for the drillstring at a second depth in the wellbore, wherein the at least one oppositional force includes a centralizer friction force based on the presence of one or more centralizers positioned within the wellbore at the second depth;

determine a second value of hook load for the drillstring at the second depth in the wellbore based on the second value of the at least one oppositional force at the second depth;

determine a first calibrated drillstring weight based on a difference between the first value of hook load and the second value of hook load;

determine a friction factor based on the first calibrated drillstring weight; and control one or more drilling operations performed on the wellbore based at least in part on the friction factor.

20. The apparatus of claim 19, wherein the program code further comprises program code executable by the processor to cause the apparatus to:

determine a third value of the at least one oppositional force for the drillstring at a third depth in the wellbore;

determine a third value of hook load for the drillstring at the third depth in the wellbore based on the third value of the at least one oppositional force at the third depth; and determine a second calibrated drillstring weight based on the first calibrated drillstring weight and on a difference between the second value of hook load and the third value of hook load.

* * * * *